US009758406B2

(12) United States Patent
Kulick, III

(10) Patent No.: US 9,758,406 B2
(45) Date of Patent: Sep. 12, 2017

(54) UNDULATING CROSS-FLOW FIXED FILM DISTRIBUTION MEDIA WITH UNITARILY FORMED END BAFFLE

(71) Applicant: Brentwood Industries, Inc., Reading, PA (US)

(72) Inventor: Frank M. Kulick, III, Leesport, PA (US)

(73) Assignee: Brentwood Industries, Inc., Reading, PA (US)

( * ) Notice: Subject to any disclaimer, the term of this patent is extended or adjusted under 35 U.S.C. 154(b) by 0 days.

(21) Appl. No.: 14/775,395

(22) PCT Filed: Mar. 14, 2014

(86) PCT No.: PCT/US2014/027236
§ 371 (c)(1),
(2) Date: Sep. 11, 2015

(87) PCT Pub. No.: WO2014/143653
PCT Pub. Date: Sep. 18, 2014

(65) Prior Publication Data

US 2016/0023929 A1 Jan. 28, 2016

Related U.S. Application Data

(60) Provisional application No. 61/792,325, filed on Mar. 15, 2013.

(51) Int. Cl.

| | |
|---|---|
| ***C10J 1/08*** | (2006.01) |
| ***C02F 3/10*** | (2006.01) |
| ***B01J 19/32*** | (2006.01) |

(52) U.S. Cl.
CPC ............... *C02F 3/109* (2013.01); *B01J 19/32* (2013.01); *C02F 3/101* (2013.01);
(Continued)

(58) Field of Classification Search
CPC ................ B01J 19/32; B01J 2219/3221; B01J 2219/32213; B01J 2219/3222;
(Continued)

(56) References Cited

U.S. PATENT DOCUMENTS 3,540,702 A * 11/1970 Uyama .................... B01J 19/32 261/112.2
3,618,778 A 11/1971 Benton et al.
(Continued)

FOREIGN PATENT DOCUMENTS

EP 1918254 A1 5/2008

OTHER PUBLICATIONS

Int'l Preliminary Examination Report issued Jun. 16, 2015 in Int'l Application No. PCT/US2014/027236.
(Continued)

*Primary Examiner* — Claire Norris
(74) *Attorney, Agent, or Firm* — Panitch Schwarze Belisario & Nadel LLP

(57) ABSTRACT

A wastewater or sludge treatment fixed film cross-flow distribution media corrugated sheet (84, 84', 84") and assemblies (118, 118', 118") thereof include corrugations (98, 98', 98"), angled of about 10° to about 80° to the top and the bottom of the sheet and the assemblies. The sheet has a unitarily formed baffle (100, 100', 100") along at least a top portion of an exposed side of the sheet (96, 96', 96") or assemblies (130, 130', 130") exposed to denser wastewater or sludge outside of the assemblies than within the assemblies that is sufficient, when joined with either a like baffle (100, 100', 100") on a like sheet (84, 84', 84") or optional substantially planar interstitial sheets (132, 132', 132") adjacent the corrugated sheets, to substantially block air used in a sparging system from exiting or the denser wastewater or sludge being treated from entering the exposed side (96, 96',
(Continued)

96") of the sheet or the exposed side (130, 130', 130") of the assemblies. Beneficial biomass forming biofilm on the surfaces within the assemblies is controlled, effectively treating the wastewater or sludge.

30 Claims, 16 Drawing Sheets

(52) U.S. Cl.
CPC ................ *B01J 2219/32213* (2013.01); *B01J 2219/32248* (2013.01); *B01J 2219/32275* (2013.01); *C02F 2203/006* (2013.01); *Y02W 10/15* (2015.05)

(58) Field of Classification Search
CPC .... B01J 2219/32227; B01J 2219/32255; B01J 2219/32248; F28F 3/10; C02F 3/101; C02F 3/109; F28C 1/00; Y10T 428/24694; Y10T 428/24711
USPC ....... 261/112.2; 210/150; 428/182, 184, 185
See application file for complete search history.

(56) References Cited

U.S. PATENT DOCUMENTS 4,215,083 A 7/1980 Fabry et al.
5,227,054 A 7/1993 Gyulavari et al.
2004/0060769 A1 4/2004 Hentschel et al.
2005/0120688 A1 6/2005 Shepherd

OTHER PUBLICATIONS

International Search Report issued Jun. 17, 2014 in Int'l Application No. PCT/US2014/027236.
Written Opininon issued Jun. 17, 2014 in Int'l Application No. PCT/US2014/027236.
Written Opinion issued Feb. 25, 2015 in Int'l Application No. PCT/US2014/027236.
Office Action issued Jul. 29, 2016 in EP Application No. 14717611.9.
Office Action issued Nov. 10, 2016 in CN Application No. 2014800162080.
Search Report issued Nov. 1, 2016 in CN Application No. 2014800162080.

* cited by examiner

UNDULATING CROSS-FLOW FIXED FILM DISTRIBUTION MEDIA WITH UNITARILY FORMED END BAFFLE

CROSS-REFERENCE TO RELATED APPLICATION

This application is a Section 371 of International Application No. PCT/US2014/027236, filed Mar. 14, 2013, which was published in the English language on Sep. 18, 2014, under International Publication No. WO 2014/143653 A1, and also claims the benefit of U.S. Provisional Patent Application No. 61/792,325, filed Mar. 15, 2013. The disclosures in their entirety of the International application and the U.S. Provisional Patent Application are hereby incorporated herein by reference.

BACKGROUND OF THE INVENTION

The present invention relates to a wastewater or sludge treatment fixed film cross-flow distribution media sheet having a unitarily formed end baffle and assemblies thereof that may include other components. Various embodiments are presented. They are used in well-known wastewater or sludge treatment processes, such as Integrated Fixed-film Activated Sludge (IFAS) processes and Submerged Fixed Film (SFF) processes.

More particularly, the sheet of the present invention is corrugated with corrugations angled at an angle of about 10° to about 80° with respect to the top and the bottom of the sheet where the corrugations of adjacent sheets with or without an optional substantially planar sheet between them are angled in opposite directions and formed into one or more assemblies within a treatment basin. The oppositely angled corrugations on adjacent corrugated sheets provide for translation of the wastewater or sludge and any entrained air from a single point source to two or more point sources and subsequent redistribution above in the assembly. The corrugated sheet with the unitarily formed baffle and assemblies thereof provide excellent available surface area for biological attachment used in wastewater and sludge treatment. The bacteria and other microorganisms, referred to as "biomass" are beneficial in the treatment of wastewater or sludge and form a "biofilm" on the corrugated sheets and other components of the assemblies with enhanced ability to control the contact of wastewater or sludge with the biofilm and performance of the biofilm and the enhance control of the supported biomass, by which the wastewater or sludge and air being sparged through an assembly or assemblies of the sheets are distributed effectively throughout the assembly to enhance the treatment of the wastewater or sludge.

Forming the sheets with the unitary baffle into the formed distribution media sheet reduces the necessary labor and associated cost of a secondary manufacturing process, reduces quality issues with gluing a separate section of material to the end of the media pack, and reduces damage to the sheets and assemblies during shipping and installation. In addition, problems, such as increased cost, damage and inefficiencies associated with additional materials used in making assemblies using the prior art sheets, are overcome with the present invention. In view of the unitary baffle formed on the sheets of the present invention, a secondary process needed to make separately attached baffles, such as extruded parts, shearing or sizing of baffle material involved as intermediate manufacturing steps using additional equipment, preparation of the existing media pack for inclusion of baffle (i.e., slicing a slot for fitting the extrusion), and ultimately assembly of the multiple components needed to install the baffle on the media assembly can be avoided. Significant damage to the media baffle used in the prior art assemblies occurs during shipping, as the packs are slid across the top of other packs during unpacking and assembly of the media towers causing the baffle and/or extrusion to become free at one end. Typical construction specifications do not allow for site repair of damaged media and the material must be returned to the factory or disposed of at the construction site.

The present invention solves these problems of the prior art cross-flow distribution media sheets and assemblies made from them. The presence of a unitary baffle as an integral part of the sheet of the present invention eliminates the need for separate baffling elements and seals the either or both sides of the assembly of sheets that is or are exposed to denser wastewater or sludge from a downcomer region in the basin outside of the assembly from intrusion into the assembly and escape of air from sparging under the assembly, enabling the entire assembly plan view to contain releasing air bubbles and therefore generate upward flow and complete biofilm control on the media surface.

In one embodiment, the unitary baffle is formed along at least a top portion of an exposed side of the sheet that is exposed to the denser wastewater or sludge, and is sufficient, when joined with either a like baffle on a like sheet or an optional substantially planar sheet positioned adjacent the front or rear surface, to substantially block air from exiting the exposed side of the sheet or the denser wastewater or sludge being treated from entering the exposed side of the sheet.

In another embodiment, the unitary baffle is formed as a substantially flat generally vertical extension extending in a direction generally perpendicular to a plane corresponding to the peaks of the corrugations or to the valleys of the corrugations and extending at least the thickness of the sheet. A further embodiment just has the front and rear sheets with the unitary baffle in the form of a substantially flat generally vertical extension that extends at least slightly more than half of the thickness of an assembly containing them by which the substantially flat generally vertical extensions overlap to form a baffle for the assembly.

Further by way of background, and to help understand the environment of the invention, structured sheet media, such as made from assemblies or packs of corrugated sheets, have been used in trickling filters. When so used, studies have been performed that concluded that vertical flow media, where the corrugations are generally vertical, rather than angled from the vertical, is not optimal for trickling filter use, because localized areas of the media surface become un-wetted through poor redistribution and the effective surface area for biomass growth is reduced. The accepted solution described in literature and industry publications is the use of cross-flow media where the corrugations of the corrugated media sheets are angled from the vertical, preferably on the order of about 30° to about 60° to allow for continual redistribution of the wastewater or sludge being treated and the air flowing through the media to treat the wastewater or sludge. Vertical flow media is installed beneath which has no cross corrugations where solids can accumulate. During this redistribution, air flowing into the tricking filter through natural or forced ventilation contacts the wastewater into which the oxygen from the air dissolves and is carried into the biomass where it is consumed by the bacterial populations for oxidation of both carbon (Biochemical Oxygen Demand or BOD) and nitrogen species (ammonia nitrogen or $NH_3$—N). Necessary biofilm control is accomplished through flushing of the media surface or termed Spülkraft flushing intensity (in mm/pass of distributor arm). Although wastewater bypass of the biomass on the media increases causing reduced effluent quality during the flushing event, the excess flushing intensity erodes thicker older biomass allowing freer air flow (reduced head loss) and new growth to form for improved overall performance. The older biomass is typically in the form of higher microorganisms and macro fauna (e.g., snails) which depends upon the periodicity of flushing and the wastewater characteristics that must be flushed to maintain a healthy bacterial population.

Air lift pumping is a common method for moving wastewater in municipal and industrial treatment plants. Aerators placed beneath structured sheet media towers (assemblies of sheets stacked above each other) have been used in the past to provide the required oxygen demand and mixing for SFF and IFAS processes.

A commonality exists between the operating requirements of a trickling filter and its SFF technology. The basis for operation of a trickling filter applies to submerged structured sheet media used in SFF technology although the method for achieving performance may differ due to the differences in configuration. Submerged structured sheet media operates on the same principal of providing a surface area for growth; however, the submerged nature of the application is sufficiently different to warrant another approach to normal operation and biofilm control. Because the media is submerged, it supports different biomass populations on its surface and is not necessarily susceptible to the same nuisance macro fauna, but to other populations that must be addressed. Additionally, because dissolved oxygen is required for the BOD and $NH_3$—N removal, air sparging is the most common and cost efficient method of transferring the required oxygen. Utilizing the air sparging to provide a single solution to these two issues of aeration and scouring has been difficult and has not been effectively achieved in the past. The major issues have been: (1) media plugging, (2) incomplete or marginal distribution of the sparged air, (3) recombination of the sparged air to form large bubbles, and (4) "necking" of the air plume within the media tower to form a narrowing plume beginning from emergence from the diffuser and continuing up to breaking the surface of the water.

Cross flow media is made up of a series of corrugated sheets of alternating direction typically at approximately 30° to approximately 60° opposing angles, measured from the bottom of the media. Because of the configuration of the sheet, communication of water and air flow can occur between these sheets and because the media is cross-stacked when installed for structural integrity, "necking" within the media tower occurs in both perpendicular plan view directions. The introduction of sparged air to the bottom of the media can also cause localized up flow where air is rising and down flow interstitial to the diffuser locations where the water returns to the bottom. An aeration pattern is typically visible at the water surface which is indicative of the aeration diffuser positions beneath the towers. The mini-currents developed and additional larger areas at the outside edges of the media tower limit the air bubble contact of the media surface (or attached biofilm surface) in the downward flowing areas because air bubbles are not as prevalent, nor are they rising. The direct impingement of the air bubbles limits the attached growth depth or thickness through biomass erosion. In areas where the flow is downward, some biomass control through water velocity scouring is realized. Minimally effective biofilm control exists in areas that are at the outer edge of the tower or under a "transition zone" of limited water velocity, or air impingement occurs under generally localized steady state conditions. Excess biomass begins to overwhelm and plug the media and the sparged air bypasses (goes around) the plug. Once this process begins, it is difficult to clear the dense anaerobic solids mass (now devoid of oxygen) within the media. Localized areas of larger bubbles than the bubbles delivered by the installed air sparger diffusers indicate that adequate aeration is present even though these areas are a result of other areas that are plugged.

Vertical-flow media preceded cross-flow corrugated media and was used in trickling filters and consisted of a series of vertically corrugated sheets. The current application for vertical flow media is for use in retrofitting Activated Bio-Filter (ABF) technology that used redwood slats to provide splash aeration to an activated sludge process and for very high solids loaded industrial applications. The ABF technology was an improvement over systems relying on poorly designed blowers which required maintenance and energy in excess of centrifugal pumps. High solids introduced to the top of a trickling filter flush more easily from a completely vertical flow media tower as crossing points of the cross corrugated media tend to accumulate rags (cellulosic and other material that agglomerates together to form what appears to be a rag).

The concept of a mixed media system incorporating combined vertical-flow and cross-flow media integrates the individual benefits of ease of flushing of the vertical-flow media with the superior distribution of cross-flow media in the tricking filter. While the use of mixed media in trickling filters is becoming more common, submerged applications of combined cross-flow and vertical-flow towers had not been done prior to the introduction of Brentwood Industries, Inc.'s AccuFAS® product line. The vertical-flow media enables a much higher surface density to be realized over cross-flow media alone for the same corrugation or flute size or opening. The reason for this is strictly due to the doubling of the number of alternating offset sheets required for the same pack width in the layup direction (i.e., more material). Improved distribution of sparged air beneath a vertical-flow structured sheet media tower is necessary to enable the process value of high surface area density media in terms of increased biofilm inventory, reduced biofilm thickness (reduced influence of diffusion limitations), and biofilm control. This is where cross-flow "distribution" media provides a great benefit by enabling the use of the high surface area vertical-flow media.

Air lift pumping is a common method for transfer of wastewater and high solids content mixed liquor suspended solids. Typical air lift pumping is accomplished by sparging air into a vertical pipe, either at the lower end of the pipe or some intermediate position along the pipe. When the air combines with the fluid, the density of the wastewater in the pipe is reduced to a level below that of the surrounding wastewater. The outside wastewater "pushes down" on the wastewater near bottom of the pipe and hydrostatics takes over, as the height of fluid in the pipe must be greater than the surrounding wastewater proportional to the amount of wastewater displaced. The pipe walls act to provide a barrier to the air/wastewater inside the pipe and the wastewater outside the pipe to provide a density difference.

Wastewater being air lift pumped in a structured sheet media tower must be returned to the bottom of the tower via a "downcomer" where no media is installed between sequentially installed towers in a basin (or the tank end wall for the first and last towers) for circulation. The returning water must recombine with newly sparged air that leaves the diffusers installed beneath the towers. The recombination of the distinct two phases of water and air is critical because narrowing of the air flow, called "necking," from lateral flow under the tower limits complete lateral distribution of flow within the entire plan view area of the tower, and ultimately limits impingement scouring and full tower up flow and thereby limits mixing of the wastewater or sludge with the air.

Standard air delivery technology using typical diffusers for wastewater applications provide point (disk) or line (tubular) source air distribution. The returning water flow must flow to the bottom center of the media tower for recirculation without moving laterally or "pinching" the air flow in the cross-current water flow. The current diffuser technology provides point or line source distribution which can be seen on the surface of the basin above the towers. It must be noted at this point that vertical-flow media is self baffling as it is a vertical tube. The distribution media and associated baffle at the side or sides exposed to the denser wastewater must serve as a boundary to turn or direct the flow under the tower, rather than allow bypass between the series of cross corrugated and any planar interstitial sheets between the corrugated sheets where they terminate to form the sides of the media pack exposed to the denser wastewater. The redirection of flow around the bottom layer of distribution media also serves to ensure that the floor is scoured of solids.

The distribution media usually includes an alternating cross corrugated sheet followed by a partial height (typically 50% of pack height) interstitial planar sheet to separate the wastewater, and air and wastewater paths to opposing offset geometric locations. In distribution media, the bottom half of the media pack does not allow for lateral communication, as the partial planar sheet eliminates communication between sheets. Currently, full height external end baffles as separate components to the sheets and assembly packs have been installed at the exposed end of the media packs at the cross corrugated sheet termination point to prevent the horizontal flow of water into the media and/or loss of air outside of the media. This promotes the separation of and the difference in density of the downcomer flow and upward flow of water being pumped. Typically, the baffles are glued directly to the end of the media pack and in some cases and edge or corner "J" extrusions are used to protect the edge and provide more positive attachment.

Vertical-flow media packs do not require end baffles as the vertical tube is substantially closed to lateral flow. Small gaps in the assembly of vertical-flow sheets at the offset which are necessary for tolerance and alternating assembly of the offset sheets do not interfere with the general operation of the vertical-flow media as a tube providing density separation. Small gaps at the horizontal interface in the assembly of media packs stacked to form the tower also do not negatively affect the capability of the vertical-flow media tower to support air lift pumping at a level sufficient for air scouring of the vertical and offset surfaces. Unless a substantial difference in air flow distribution exists within the vertical-flow media tower, the entire tower provides upward flow through air lift pumping. The distribution media eliminates, or if a diffuser is damaged, minimizes the potential for this difference in air flow distribution.

The fixed film cross-flow distribution media sheet having a unitarily formed exposed side baffle according to the present invention and assemblies made using them overcome the disadvantages of the current systems and apparatus and provide efficient and effective treatment of wastewater or sludge, while reducing the cost of labor involved with assembling separate baffles at the exposed ends of the assemblies of packs and towers, as well as significantly reduce or eliminate the additional handling for the separate baffle installation that is a source of downtime, and fairly often, damage to the baffle or the assembly of sheets.

BRIEF SUMMARY OF THE INVENTION

One aspect of the present invention relates to a wastewater or sludge treatment fixed film cross-flow distribution media sheet comprising a corrugated sheet of material having a front surface, a rear surface, a top, a bottom, a first side, a second side, a height extending from the bottom to the top, and a width extending from the first side to the second side, the corrugations being present in the front and rear surfaces with peaks at the front surface and valleys at the rear surface, the corrugations being angled at an angle of about 10° to about 80° with respect to the top and the bottom of the sheet, the sheet having a thickness extending from a plane corresponding to the peaks of the corrugations on the front surface to a plane corresponding to the valleys of the corrugations on the rear surface, the sheet further comprising a unitarily formed baffle along at least a top portion of an exposed side of the sheet that is to be exposed to denser wastewater or sludge outside of the width of the sheet than within the width of the sheet, the baffle being sufficient, when joined with either a like baffle on a like sheet or an optional substantially planar sheet positioned adjacent the front or rear surface, to substantially block air from exiting the exposed side of the sheet or the denser wastewater or sludge being treated from entering the exposed side of the sheet.

As used herein, the term "unitarily formed" with respect to the baffle means that the corrugated sheet and the baffle are formed as a single, unitary, integrated sheet, rather than having the baffle and the corrugated sheet as separate components that must be attached to each other in an effort to make an integral unit comprising the corrugated sheet and baffle.

In one embodiment, the unitarily formed baffle extends along the exposed side of the sheet for the height of the sheet. In another embodiment, the unitarily formed baffle extends along the exposed side of the sheet for a top half of the height of the sheet.

In one embodiment, the unitarily formed baffle is a generally vertical corrugation, where the term "corrugation" is synonymous with the term "flute." In another embodiment the unitarily formed baffle is a substantially flat generally vertical extension extending in a direction generally perpendicular to plane corresponding to the peaks of the corrugations or to the valleys of the corrugations and extending at least the thickness of the sheet.

Another aspect of the present invention relates to an assembly for supporting biomass for treating wastewater or sludge using the corrugated sheets of the present invention. The assembly comprises a plurality of corrugated sheets of material, with optional substantially planar sheets of material arranged between adjacent corrugated sheets, the assembly having a front defined by a front surface of a front corrugated sheet, a rear defined by a rear surface of a rear corrugated sheet, a top, a bottom, a first side, a second side, a height extending from the bottom to the top, and a width extending from the first side to the second side, the optional substantially planar sheets extending at least about half of the height of the assembly, the corrugations of the corrugated sheets of the assembly being present in the front and rear surfaces of the corrugated sheets with peaks at the front surface and valleys at the rear surface, the corrugations being angled at an angle of about 10° to about 80° with respect to the top and the bottom of the corrugated sheet, wherein the corrugations of adjacent corrugated sheets with or without the optional substantially planar sheet between them are angled in opposite directions, each corrugated sheet having a thickness extending from a plane corresponding to the peaks of the corrugations on the front surface of the corrugated sheet to a plane corresponding to the valleys of the corrugations on the rear surface of the corrugated sheet, each of a sufficient number of corrugated sheets further comprising a unitarily formed baffle along at least a top portion of an exposed side of the corrugated sheet on a side of the assembly to be exposed to denser wastewater or sludge outside of the assembly than within the assembly, the baffle being sufficient, when joined with either a like baffle on a like corrugated sheet or when joined with the optional substantially planar sheet, to substantially block air from exiting the exposed side of the assembly or the denser wastewater or the sludge being treated from entering the exposed side of the assembly.

In various embodiments of the assembly, the baffle extends along the exposed side of the corrugated sheet for the height of the assembly or for about a top half of the height of the assembly, and may be in the form of generally vertical corrugations or a substantially flat generally vertical extension extending in a direction generally perpendicular to a plane corresponding to the peaks of the corrugations of the corrugated sheet or to the valleys of the corrugations of the corrugated sheet and extending at least the thickness of the corrugated sheet.

In other various embodiments of the assembly, the optional substantially planar sheets are present in the assembly and extend for the height of the assembly or for about a bottom half of the height of the assembly.

Another aspect of the present invention relates to an assembly where only the front and rear corrugated sheet have a unitarily formed baffle, where the baffles overlap to substantially block air from exiting or the denser wastewater or the sludge being treated from entering the exposed side of the assembly. More particularly, this aspect relates to an assembly for supporting biomass for treating wastewater or sludge, the assembly comprising a plurality of corrugated sheets of material, with optional substantially planar sheets of material arranged between adjacent corrugated sheets, the assembly having a front defined by a front surface of a front corrugated sheet, a rear defined by a rear surface of a rear corrugated sheet, a top, a bottom, a first side, a second side, a height extending from the bottom to the top, and a width extending from the first side toward the second side, the corrugations of the corrugated sheets of the assembly being present in the front and rear surfaces of the corrugated sheets with peaks at the front surface and valleys at the rear surface, the corrugations being angled at an angle of about 10° to about 80° with respect to the top and the bottom of the assembly, wherein the corrugations of adjacent corrugated sheets with or without the optional substantially planar sheet between them are angled in opposite directions, each corrugated sheet having a thickness extending from a plane corresponding to the peaks of the corrugations on the front surface of the corrugated sheet to a plane corresponding to the valleys of the corrugations on the rear surface of the corrugated sheet, the front corrugated sheet further comprising a unitarily formed baffle along at least a top portion of an exposed side of the corrugated sheet that is on a side of the assembly to be exposed to denser wastewater or sludge outside of the assembly than within the assembly, the baffle being a substantially flat generally vertical extension that extends in a direction generally perpendicular from the plane corresponding to the peaks on the front surface of the front corrugated sheet to a free edge that extends a distance of at least slightly more than half of the thickness of the assembly, wherein the rear corrugated sheet is in a form of the front corrugated sheet of the assembly that is rotated 180° front to rear, such that the free edge of the substantially flat generally vertical extension of the rear corrugated sheet overlaps with the free edge of the substantially flat generally vertical extension of the front corrugated sheet to substantially block air from exiting the exposed side of the assembly or the denser wastewater or sludge being treated from entering the exposed side of the assembly.

As in other embodiments of the assembly, the substantially flat generally vertical extensions of the front and rear corrugated sheets extend along the exposed side of the corrugated sheet for the height of the assembly. Alternatively, the substantially flat generally vertical extensions of the front and rear sheets extend along the exposed side of the sheet for about a top half of the height of the assembly.

Also as in other embodiments of the assembly, the optional substantially planar sheets are present in the assembly and extend for the height of the assembly or for about a bottom half of the height of the assembly.

DEFINITIONS

In addition to the definition of words or terms set forth in other sections hereof, the following definitions will apply to words or terms as used throughout this specification, claims and abstract.

As used herein, the singular forms "a," "an," and "the" include plural referents, and plural forms include the singular referent unless the context clearly dictates otherwise.

As used herein, the term "about" with respect to any numerical value, means that the numerical value has some reasonable leeway and is not critical to the function or operation of the component being described or the system or subsystem with which the component is used.

Certain directional terminology is used herein for convenience only and is not limiting. Words designating direction such as "bottom," "top," "front," "rear," "left," "right," "sides," "up" and "down" designate directions in the drawings to which reference is made, but are not limiting with respect to the orientation in which the invention and its components and apparatus may be used. The terminology includes the words specifically mentioned above, derivatives thereof and words of similar import. Similarly, the term "exposed side" with respect to a side of a sheet or an assembly of sheets refers to a side exposed to denser wastewater or sludge, from which the exit of air and the entry of the denser wastewater or sludge is blocked by the unitarily formed baffle.

As used herein, the term "generally" or derivatives thereof with respect to any element or parameter means that the value, element or has the basic shape, or the parameter has the same basic direction, orientation or the like to the extent that the function of the element or parameter would not be materially adversely affected by somewhat of a change in the element or parameter. By way of example and not limitation, the baffle being "generally vertical" refers not only to an absolutely vertical baffle but one that could be tilted slightly from the vertical such that cross-flow would not occur and the air and wastewater or sludge would be substantially prevented from crossing the baffle. Similarly, an element that may be described as "generally perpendicular" to another element can be oriented a few degrees more or less than exactly 90° with respect to absolutely perpendicular, where such variations do not materially adversely affect the function of the corrugated sheet with the unitarily formed baffle or assembly containing them.

As used herein, the term "substantially" with respect to any numerical value or description of any element or parameter means precisely the value or description of the element or parameter but within reasonable variations of industrial manufacturing tolerances that would not adversely affect the function of the element or parameter or apparatus containing it. By way of example and not limitation, when the baffles are said to "substantially block air from exiting the exposed side of the sheet (or assembly of sheets) or the denser wastewater or sludge being treated from entering the exposed side of the sheet (or assembly of sheets)", if a little air, wastewater or sludge bypasses the baffle in an amount that does not adversely affect the wastewater or sludge treating function, to an extent less than the amount that may bypass properly configured and attached separate baffles, then the baffle would be considered to have performed its blocking function adequately.

BRIEF DESCRIPTION OF THE SEVERAL VIEWS OF THE DRAWINGS

The foregoing summary, as well as the following detailed description of various embodiments, including preferred embodiments of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

DETAILED DESCRIPTION OF THE PREFERRED EMBODIMENTS

The present invention will be described with reference to the drawings, where like numerals indicate like elements throughout the several views. Initially, the environment of the invention will be described with respect to the schematic biological wastewater or sludge treatment system 10 shown in FIGS. 1 and 2 which is typical but not exclusive of the type where sheets and assemblies of the present invention could be used. Thus, the sheets and assemblies could be used in other embodiments of systems using Submerged Fixed-Film (SFF) or Integrated Fixed-film Activated Sludge (IFAS) processes.

Figure 1:
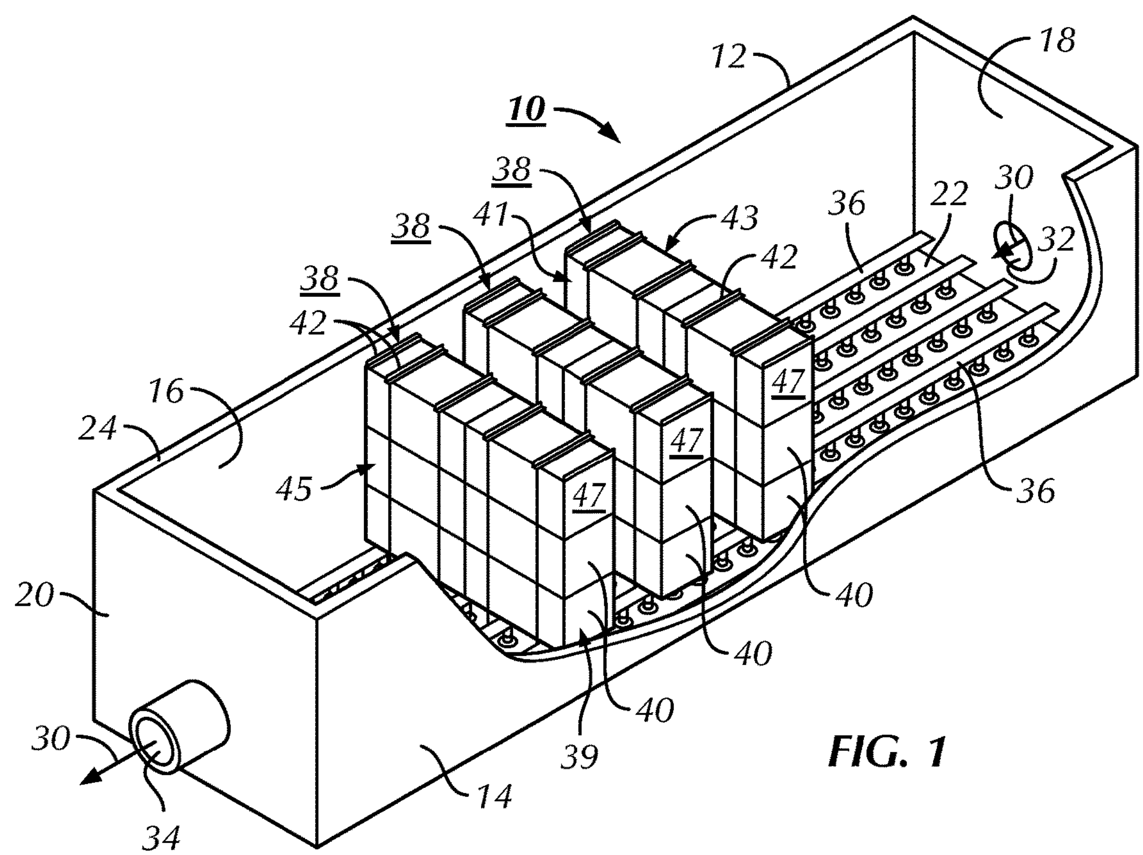
FIG. 1 is a schematic top isometric view of a biological wastewater or sludge treatment system showing the environment of use of assemblies made from sheets in accordance with an embodiment of the present invention.
Figure 2:
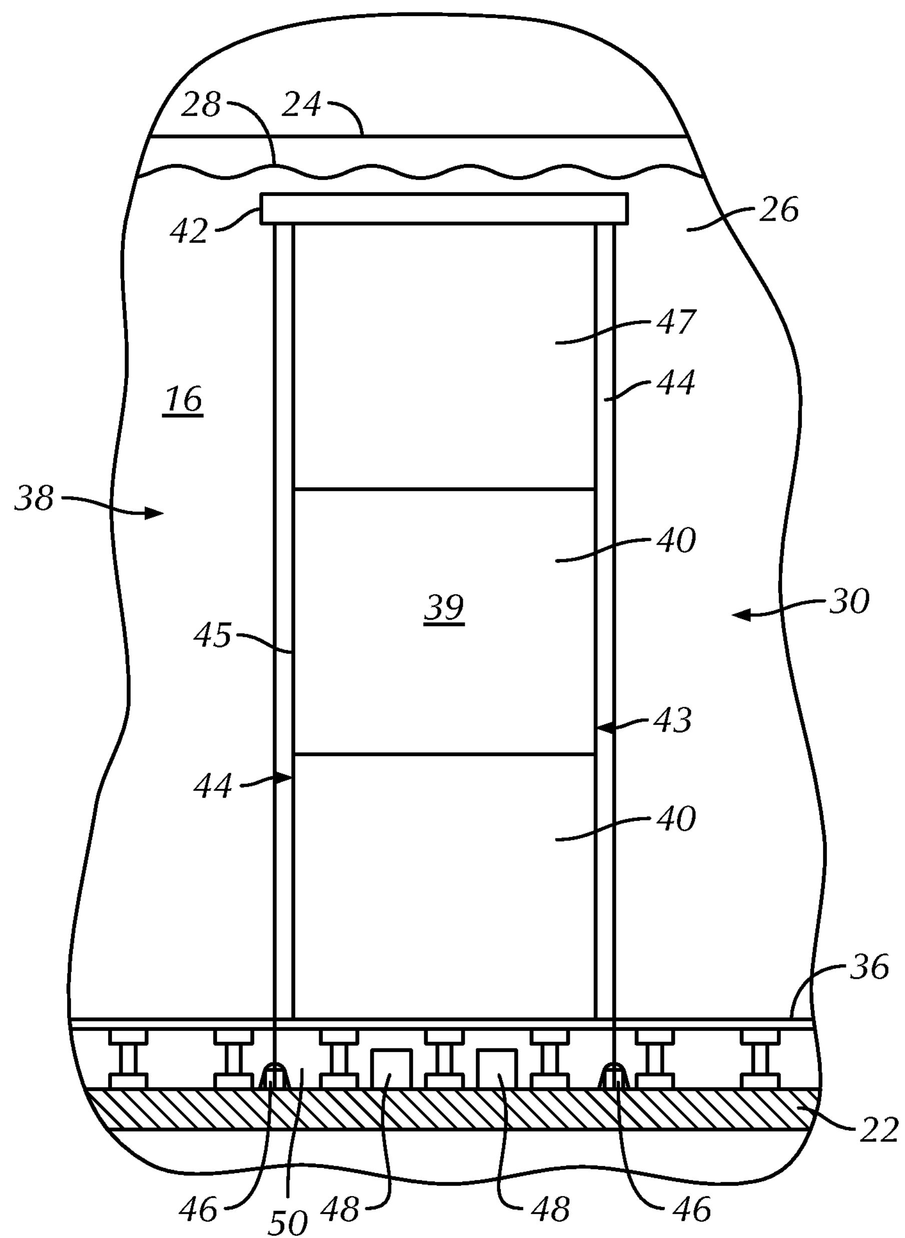
FIG. 2 is an enlarged side elevation view of a portion of the biological treatment system of FIG. 1, showing one tower or stack of assemblies according to the present invention.

The biological wastewater or sludge treatment system 10 shown in FIGS. 1 and 2 is a SSF system and includes a basin 12 having a front wall 14, a rear wall 16, a first side wall 18, a second side wall 20 and a bottom 22. The top of the basin 12 is defined by a top wall 24. Wastewater or sludge 26, shown in FIG. 2, with a water level 28 is treated in the system 10 and flows through the basin 12 in the general direction of arrows 30 while being treated. The wastewater or sludge 26 enters the basin 12 through an inlet 32 and flows out of the basin 12 after being treated through an outlet 34.

The basin 12 also includes lower support structures 36 to support above the bottom 22 at least one, and preferably a plurality of towers or stacks 38 of combined cross-flow wastewater or sludge distribution media assemblies 40 and vertical flow media assemblies 47. At least one of the cross-flow media assemblies 40, and preferably all of the cross-flow media assemblies 40, are formed using the sheets of the present invention. Details of the sheets and the assemblies 40 will be described below. The stacks of combined cross-flow media assemblies 40 and vertical flow media assemblies 47 that form the towers 38 are retained in position in the basin 12 by upper support members 42 that are connected at their ends to an upper end of straps or cables 44. The lower end of the straps or cables 44 are connected to anchors 46 that are attached to the bottom 22 of the basin 12. The distribution media towers 38 have a front side 39 adjacent the front wall 14 of the basin 12, a rear wall 41 adjacent the rear wall 16 of the basin 12, a first side 43 which is exposed to the denser wastewater or sludge 26, and a second side 45, which is also exposed to the denser wastewater or sludge 26.

As schematically shown in FIG. 1, each tower 38 may comprise several assemblies 40, stacked several high, side by side and front to back. FIG. 1 shows a typical tower 38 having assemblies 40 stacked two high and two front to back, with the vertical flow media assemblies 47 on top of each stack of cross-flow media assemblies 40 in three groups. Typically, the second layer of cross-flow media assemblies 40 are rotated 90° with respect to the first layer to assure better stability of the towers 38 and mixing of the air with the wastewater and sludge within the assemblies. This is by way of example and not limitation. Only the sides of the cross-flow media assemblies 40 that are exposed to the wastewater or sludge in the downcomer regions within the basin 12 need have baffles, as the sides of the cross-flow media assemblies 40 that abut each other or the walls of the basin would already substantially block the air from leaving the assembly 40 or the denser wastewater or sludge being treated from entering the assembly 40.

Air diffusers 48 are located in a gap 50 between the bottom 22 of the basin 12 and the bottom of each distribution media tower 38. As described in the Background section above, air from the diffusers flows generally upwardly through the distribution media towers where it contacts the wastewater or sludge and the biomass that forms biofilms on the surfaces of the media assemblies 40. In the SFF system 10 schematically shown in FIGS. 1 and 2, the top of the distribution media towers 38 are submerged in and therefore preferably below the level 28 of the wastewater or sludge 26 being treated.

Figure 3:
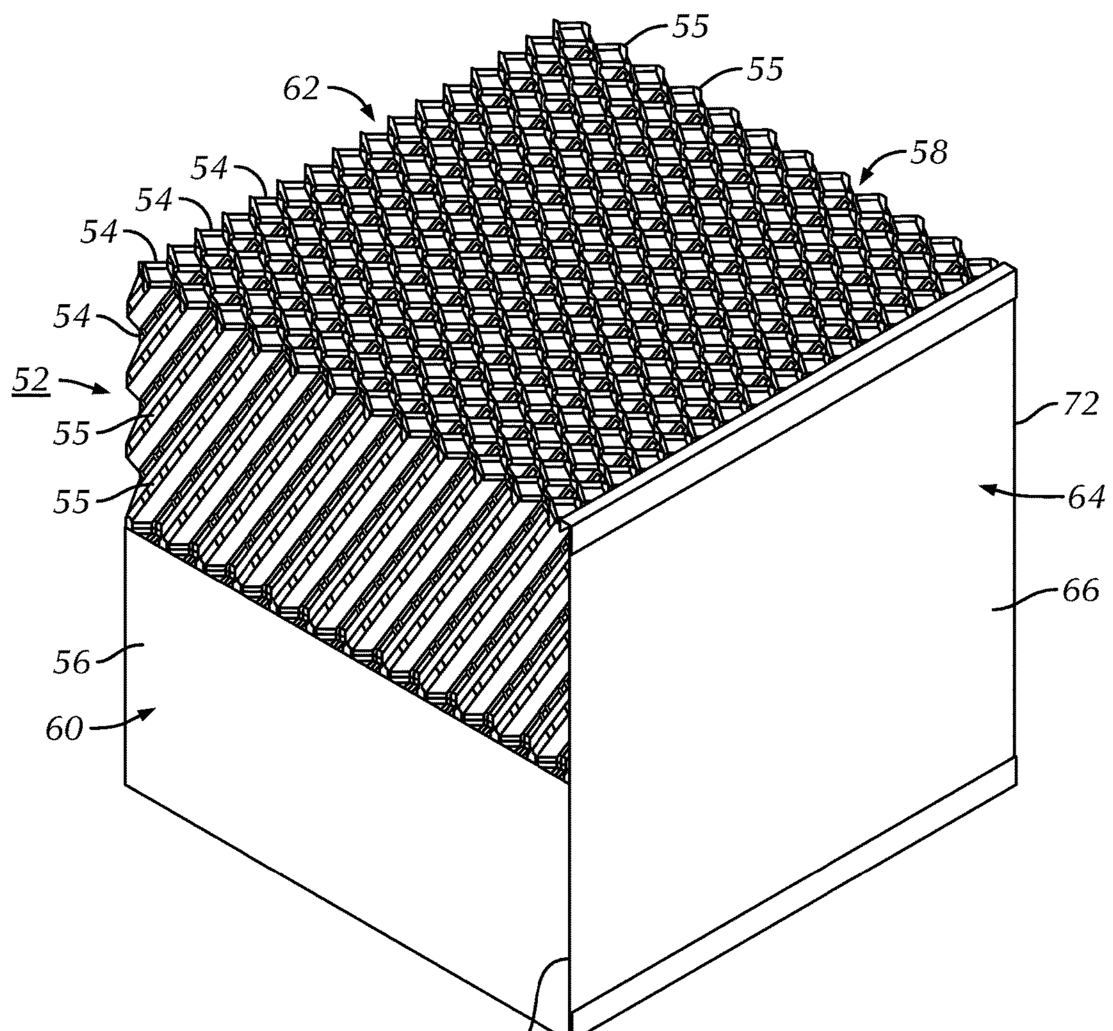
FIG. 3 is a rear second side isometric view of a prior art assembly of sheets used in a biological wastewater or sludge treatment system of a type of FIGS. 1 and 2.
Figure 4:
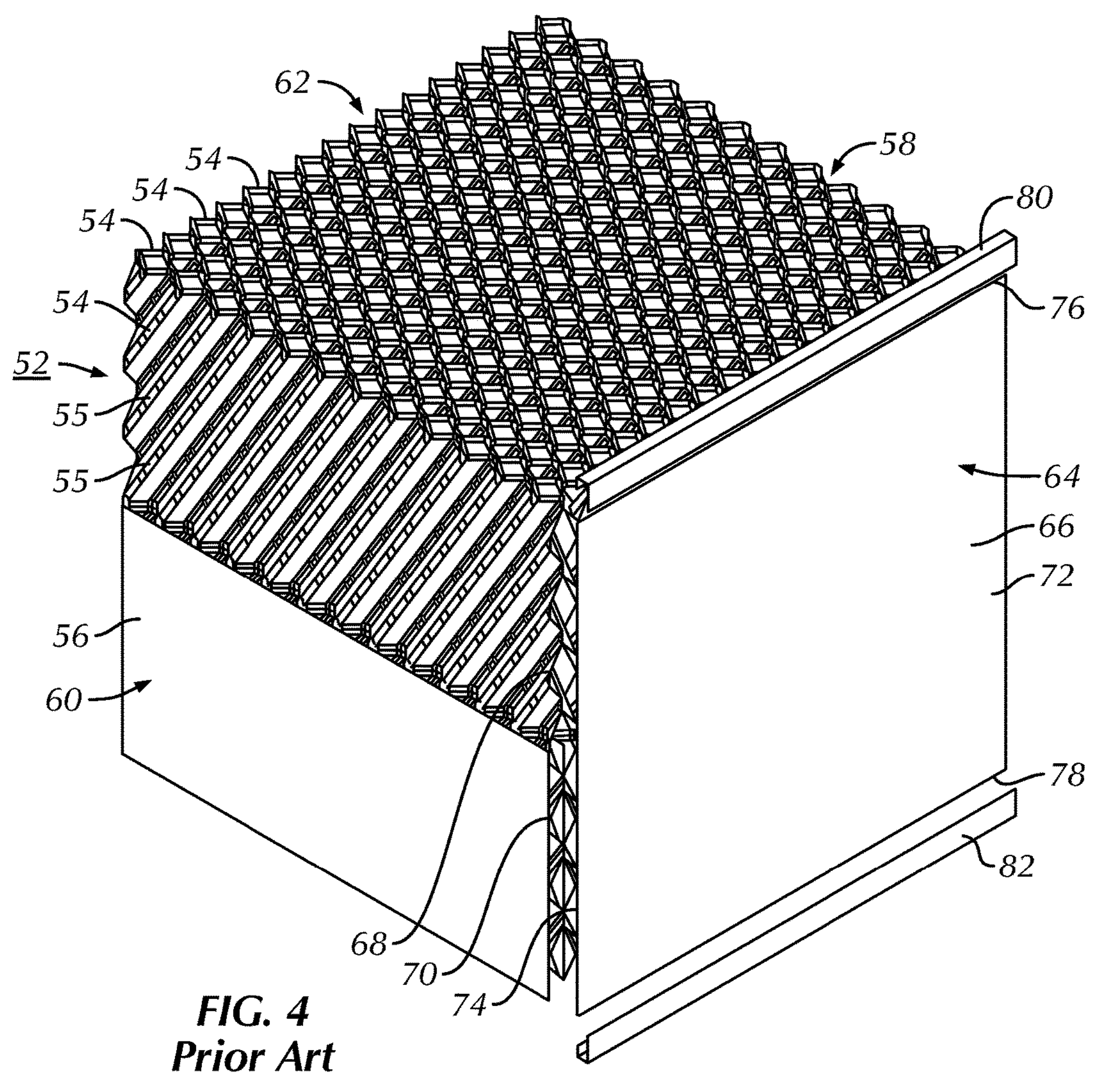
FIG. 4 is an exploded rear second side isometric view of the prior art assembly of FIG. 3.
Figure 5:
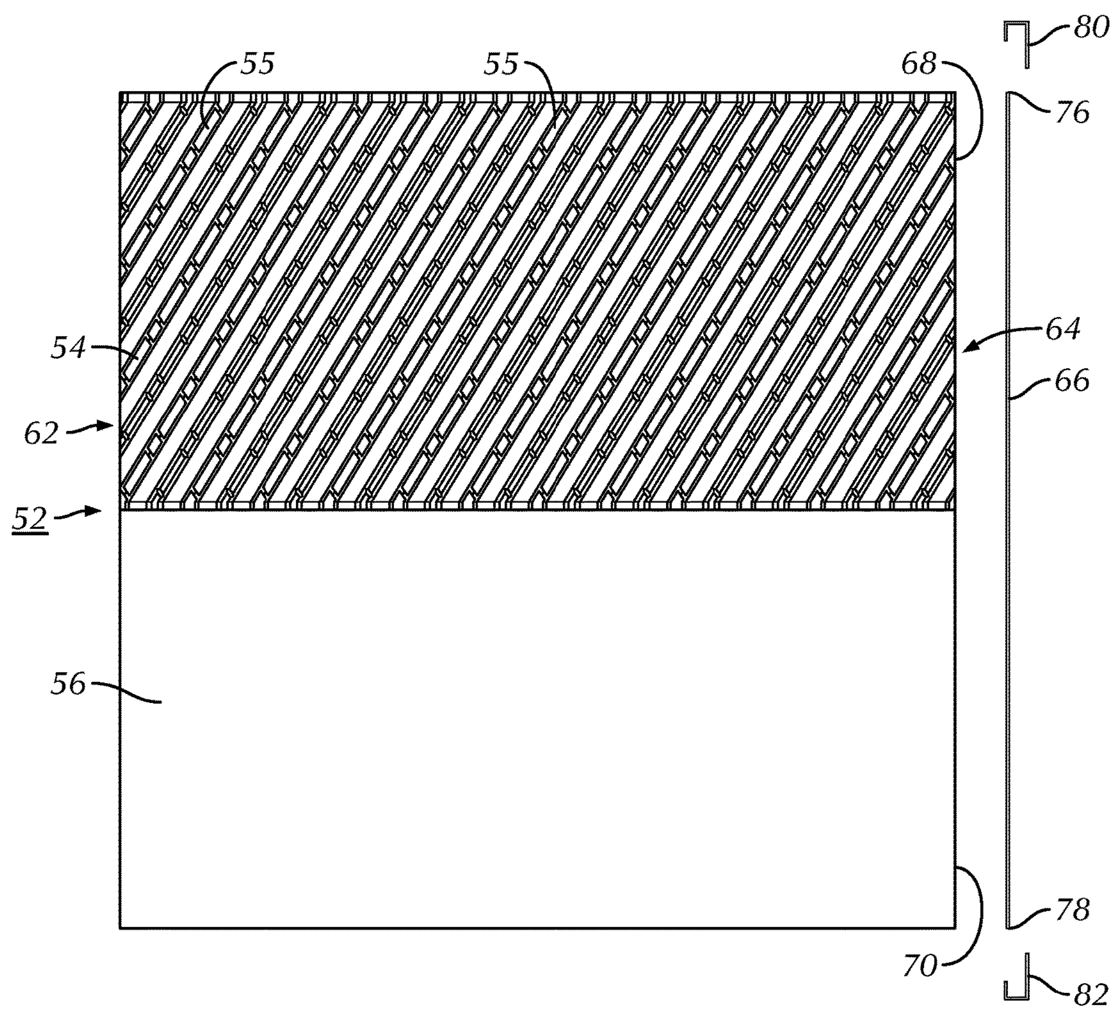
FIG. 5 is an exploded second side elevation view of the prior art assembly of FIG. 3.

The distribution media assemblies 40 comprise sheets of the present invention having the unitarily formed baffles, which will be described below after the following description of prior art distribution media assemblies 52 of corrugated sheets 54 with angled corrugations 55 and substantially planar interstitial sheets 56, which are shown in FIGS. 3-5, since the sheets and assemblies of the present invention will be more clear when understood in comparison to the prior art sheets and assemblies.

FIG. 3 is a rear second side isometric view of a prior art assembly of sheets that can be and has been used in a biological wastewater or sludge treatment system of a type of FIGS. 1 and 2. FIG. 4 shows the same prior art assembly 52 in the same orientation, except that the three-piece exposed side baffle is shown in an exploded view. FIG. 5 shows a second side elevation view of the prior art assembly 52 with the baffle shown in the exploded view. The prior art assemblies 52 would be stacked in conjunction with vertical flow media assemblies, instead of the assemblies 40 of the present invention, to form combined vertical flow and distribution media towers like the towers 38 shown in FIGS. 1 and 2. Orienting the prior art assembly 52 as shown in FIG. 3 within the basin 12 in FIGS. 1 and 2, where the assembly 52 could be on the bottom layer of the towers 38, for example, the assembly 52 has a front 58 forming part of the front 39 of the tower 38, a rear 60 forming part of the rear 41 of the tower 38, a first side 62 forming part of the first side 43 of the tower 38 and a second side 64 forming part of the second side 45 of the tower 38. In the proposed configuration of FIGS. 1 and 2, the assembly 52 requires a baffle plate 66 and J-shaped extrusions, 80 and 82 installed both at the first side 62 and at the second side 64 of the assembly 52, since both of these sides would be exposed to the denser wastewater and sludge. However, for the sake of convenience and better understanding, a baffle plate 66 is shown only on the rear side 64 of the assembly 52. The prior art assembly 52 also includes substantially planar sheets 56 between and adjacent the corrugated sheets 54, as seen in FIGS. 3, 4 and 5. Each corrugated sheet 54 is aligned with respect to the facing corrugated sheet 54 so that the corrugations 55 of one corrugated sheet 54 are at opposite angles with respect to the corrugations 55 on the facing corrugated sheet 54.

The prior art assemblies 52 significantly include a separate baffle plate 66 substantially blocking air from exiting or denser wastewater or sludge from entering the exposed sides of the assembly 52. The baffle plate 66 is glued or otherwise bonded to the edges 68 of the corrugated sheets 54 and the edges 70 of the interstitial substantially planar sheets 56 at the second side 64 of the assembly 52. Since there is little surface area exposed at the side edges 68 and 70, a lot of glue is used but still the bonding often is not fully effective. The use of the separate baffle plate 66 is rather time consuming, as it requires an extra step, with an extra piece of material and extra labor to bond the baffle plate 66 with more glue to the second side 64 of the prior art assembly 52. Moreover, all four edges, namely the front edge 72, the rear edge 74, the top edge 76 and the bottom edge 76, are initially exposed and subject to being pulled away from the edges 68 and 70 of the corrugated sheets 54 and 55, and the substantially planar sheets 56 at the second side 64 of the prior art assembly 52. In an effort to remedy this problem, attempts were made to cover the top edges 76 and the bottom edges 78 with J-shaped extrusions 80 and 82, respectively that were glued or otherwise bonded to the upper and lower portions of the baffle plate 66 to protect the top and bottom outside corners of the second side of the prior art assembly 52. The J-shaped extrusions 80 and 82 further slowed the manufacturing process and made it more costly and labor intensive. Even with the separate J-shaped extrusions 80 and 82 bonded to the top and bottom corners, the J-shaped extrusions 80 and 82 tend to be susceptible to being pulled away from the assembly 52 during shipping, handling and stacking to form distribution media towers.

The foregoing deficiencies with the prior art assemblies 52 led to the invention of the sheets having the unitarily formed baffles of the present invention and their use in the assemblies of the present invention, which overcomes the deficiencies of the prior art.

Figure 6:
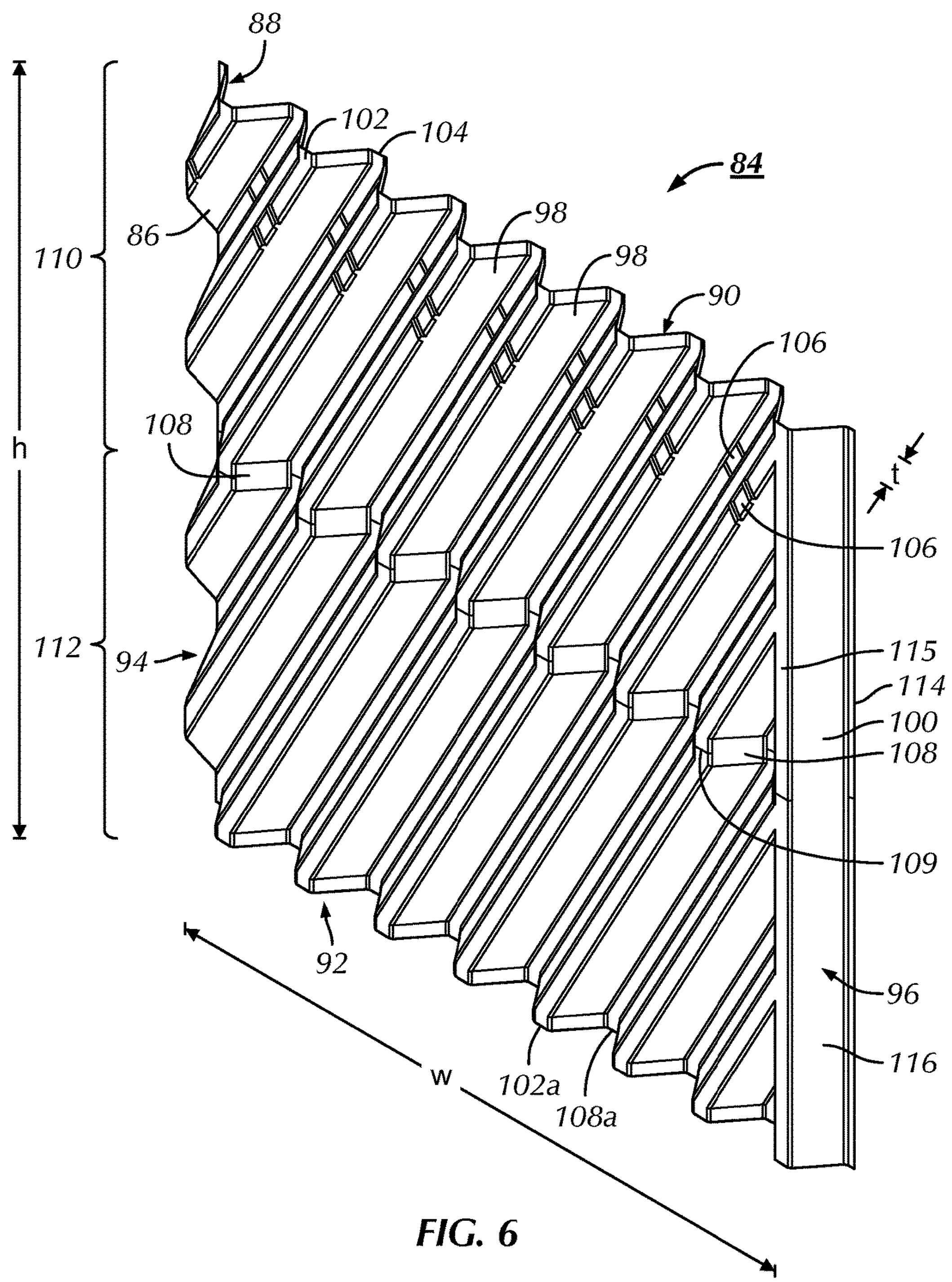
FIG. 6 is a rear second side isometric view of one embodiment of a corrugated sheet having a unitarily formed baffle according to the present invention.

FIG. 6 is a rear second side isometric view of one embodiment of a corrugated wastewater or sludge treatment fixed film cross-flow distribution media sheet 84 having a unitarily formed baffle according to the present invention.

The corrugated sheet 84 comprises a corrugated sheet of material having a front surface 86, a rear surface 88, a top 90, a bottom 92, a first side 94, a second side 96, a height "h" extending from the bottom 92 to the top 90, and a width "w" extending from the first side 94 to the second side 96. The corrugated sheet 84 may have any dimensions for "h" and "w" as desired for readily forming and handling the sheet and assemblies made from a plurality of sheets. Typically, the height "h" is about 2 feet (about 0.61 meter) and the width "w" is about 4 feet (about 1.21 meters), but the dimensions can vary widely.

The sheet 84 may be made of any material that can be readily formed to have corrugations 98 and a unitarily formed baffle 100 that is an integral part of the corrugated sheet 84 and not a separate component that has to be bonded to the sheet 84. For example, the individual sheets may be made from thermoplastic material such as plasticized or unplasticized polyvinylchloride (PVC), polypropylene, polystyrene, and engineering thermoplastics such as that sold by General Electric Company under the trademark NORYL, metals such as galvanized steel, aluminum, copper, or the like, materials such as asbestos or cellulose, or alloys of thermoplastic materials, such as alloys of PVC with other thermoplastic materials, composite materials such as fibrous cellulosic stock impregnated with a thermoplastic resin, or the like.

Examples of other resins and engineering resins which may be used include acetals, nylons, polyphenylene oxides, polycarbonates, polyether sulfones, polyaryl sulfones, polyethylene terephthalates, polyetheretherketones, polypropylenes, polysilicones, polyphenylene sulfides, polyionomers, polyepoxies, polyvinylidene halides, and the like. Currently, PVC having little or no plasticizer, and polypropylene are preferred.

The individual corrugated sheet 84 with its unitarily formed baffle 100 may be manufactured by any conventional technique which is appropriate for the material used to make the sheet. For example, when the sheet 84 and its unitary baffle 100 are manufactured from substantially flat stock material of a thermoplastic polymeric resin, such as unplasticized PVC, the corrugated sheet 84 and its unitary baffle 100 may be thermally formed by a process such as vacuum forming, molding, hot stamping, corrugating, cold forming, or the like.

The sheet 84 has corrugations 98 present in the front surface 86 and the rear surface 88, with peaks 102 at the front surface 86 and valleys 104 at the rear surface 88. The corrugations 98 are angled at an angle of about 10° to about 80° with respect to the top 90 and the bottom 92 of the sheet 84 to provide for translation of the wastewater or sludge and any entrained air from a single point source to two or more point sources and subsequent redistribution above in an assembly 40 of the sheets 84. The angle of the corrugations 98 may vary from about 10° to about 80° from the horizontal, namely with respect to the top 90 and bottom 92 of the sheet 84 when the sheet is in its normal generally vertical orientation in use as a distribution media sheet. Corrugation angles of about 45° to about 60° are preferred, and for most applications, an angle of about 60° is more preferred. The pitch or depth of the corrugations 98 defining the thickness "t" of the corrugated sheet 84, determined by the angle of the walls of the corrugations can vary widely. The thickness "t" of preferred embodiments of the corrugated sheet 84 is about 0.5 inch (about 1.27 cm) to about 2.5 inches (about 6.35 cm), and more preferably about 0.75 inch (about 1.91 cm) to about 1.25 inch (about 3.18 cm).

The corrugations 98 preferably have positioners 106 at the peaks 102 and valleys 104 to position and form glue or bonding pads with adjacent sheets 84 when the sheets 84 are assembled into an assembly according to another aspect of the present invention, as described below. The corrugated sheet 84 also preferably has offsets 108 in the middle of the peaks 102 and valleys 104 to accommodate the presence of and to form glue or bonding pads with substantially planar interstitial sheets 56 as also described below that may be and preferably are placed between adjacent corrugated sheets 84 when an assembly is made of the sheets. The sheet 84 has a top portion 110, preferably about a top half and a bottom portion 112, preferably about a bottom half, where the top and bottom portions or halves are preferably determined by the offsets 108 when the offsets 108 are present as they are preferred to be. The offsets 108 also define the location of a step 109 in the elevation of the corrugation defining secondary peak elevations **102*a* and valleys 104*a* to accommodate the gauge of the substantially planar interstitial sheets 56 to provide a nominally rectilinear finished assembly 40**.

The corrugated sheet 84 has a thickness "t" extending from a plane corresponding to the peaks 102 and **102*a* of the corrugations 98 on the front surface 86 to a plane corresponding to the valleys 104 and 104*a* of the corrugations 98 on the rear surface 88**.

Figure 7:
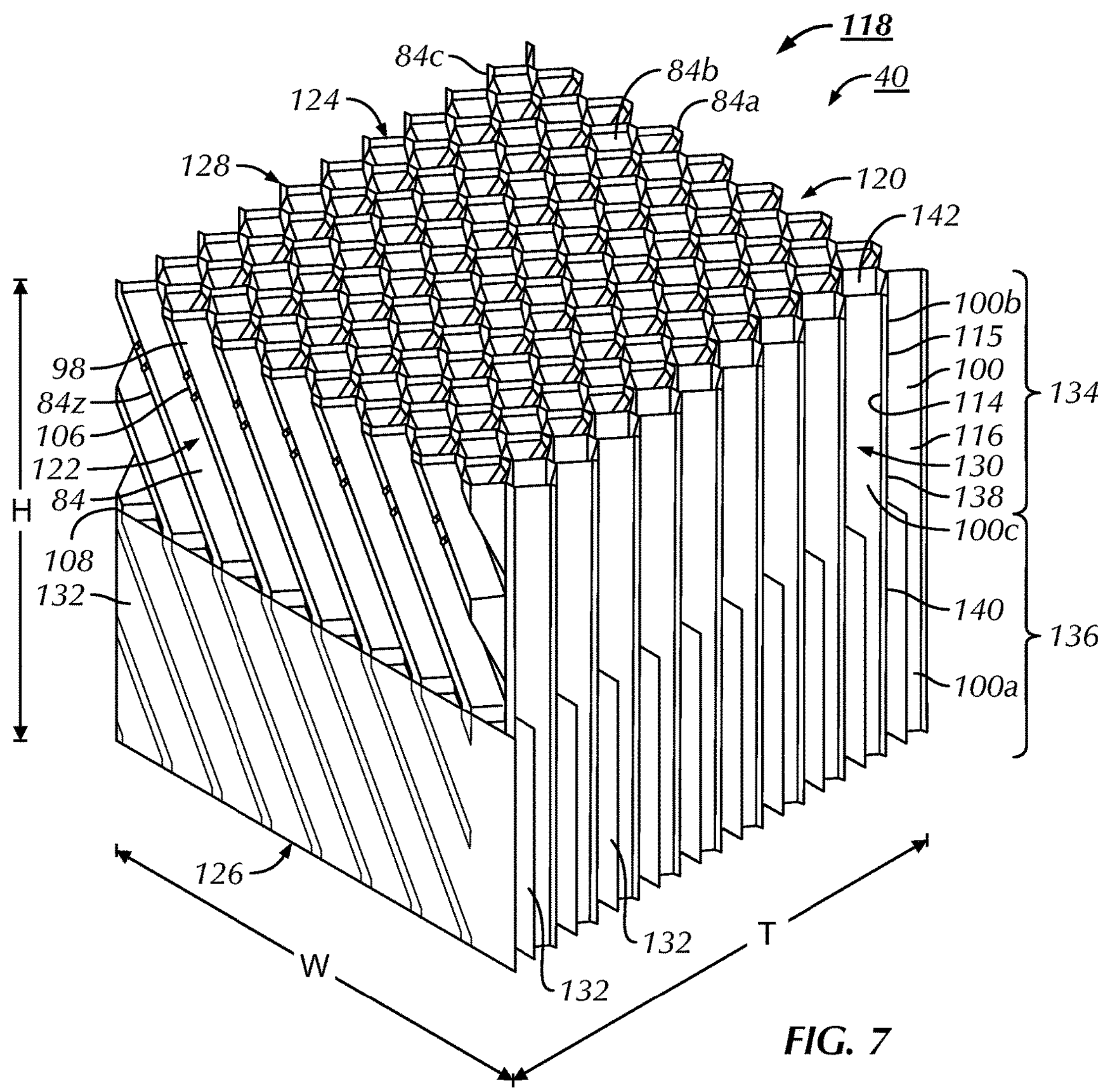
FIG. 7 is a rear second side isometric view of one embodiment of an assembly according to the present invention using the corrugated sheets having a unitarily formed baffle as shown in FIG. 6.
Figure 8:
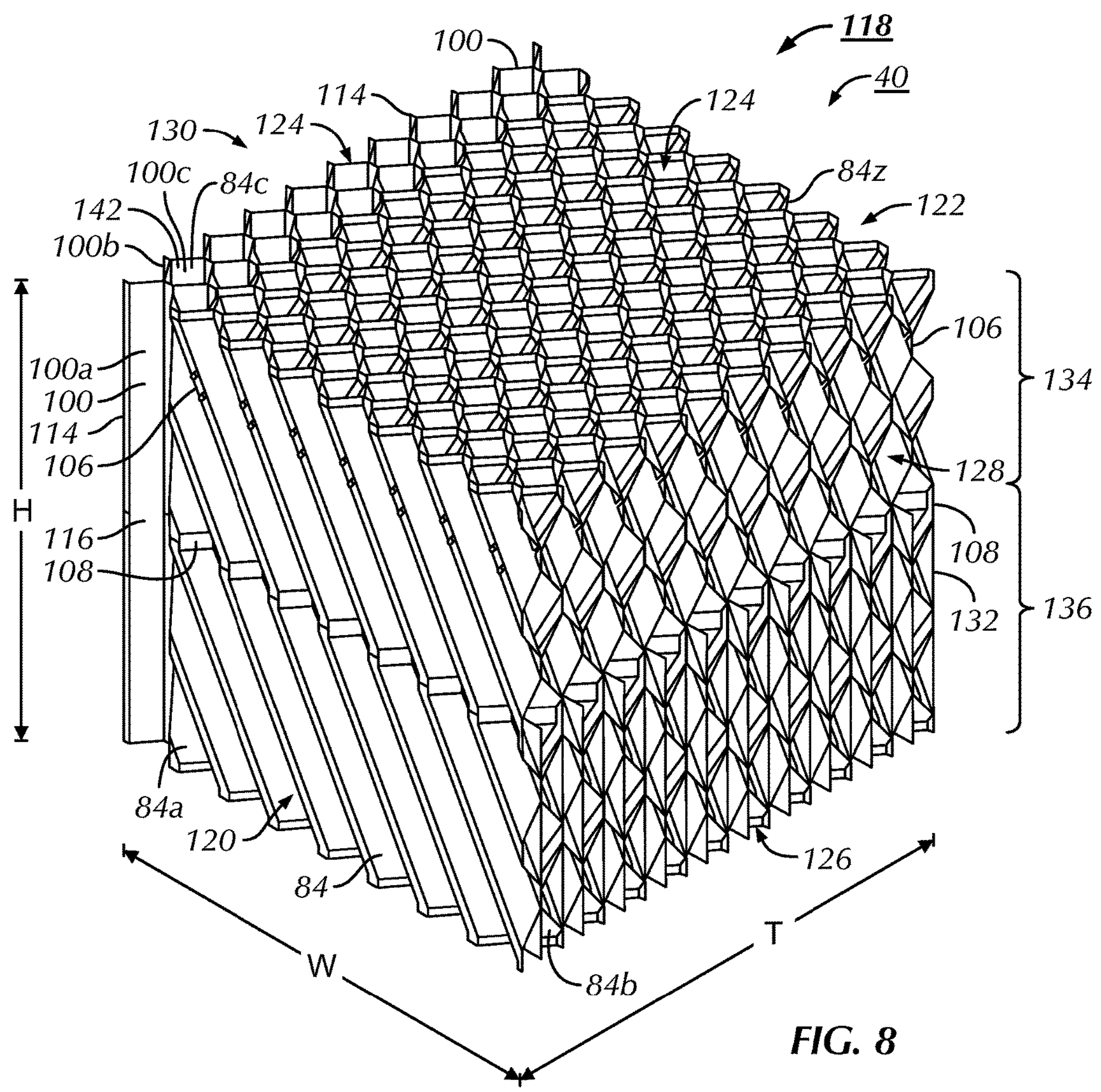
FIG. 8 is a front first side isometric view of the embodiment of the assembly shown in FIG. 7.

The corrugated sheet 84 further comprises a unitarily formed baffle 100 along at least a top portion 110 of any side 94 and/or 96 of the sheet that will be exposed to the denser wastewater or sludge to be treated when used in an assembly 40 or 118 of such sheets, where the assembly 40, 118 is best seen in FIGS. 7 and 8. When the assembly 40, 118 is in the orientation at the bottom of the media tower 38 as shown in FIGS. 1 and 2, both sides of the sheet 84 would include the unitarily formed baffle 100. However, for the sake of clarity and ease of understanding, the baffle 100 is shown in FIGS. 6, 7 and 8 only on the second side 96 of the sheet 84. The baffle 100 (see baffle **100*b* in FIG. 7), is sufficient, when joined with either a like baffle 100 on a like corrugated sheet 84 (see baffle 100*c* in FIG. 7) or an optional substantially planar sheet positioned adjacent the front surface 86 or rear surface 88 of a corrugated sheet 84, to substantially block air from exiting or the denser wastewater or sludge being treated from entering the second side 96 of the sheet 84 and the second side 130 of the assembly 118. To assure a positive, substantially leak-free joining of baffles 100 or baffles 100 with optional substantially planar sheets, a flange 114 is formed along the free edge of the baffle 100 and a flange 115 is also formed along the edge of the corrugated sheet 84 where the baffle 100 joins the corrugated sheet 84. These allow adequate surface area for glue or other bonding to form a good seal between the joined portions of the baffles 100, such as baffles 100*b* and 100*c***.

The unitarily formed baffle 100 may take various forms. One preferred embodiment is that the baffle 100 is formed as a generally vertical corrugation or flute 116 as shown in FIG. 6, which also depicts the baffle 100 extending for the full height "h" of the sheet in this embodiment. The baffle 100 may extend only along the top portion 110 or about halfway down from the top 90 of the second side 96 of the sheet 84 in other embodiments described below. When the unitary baffle 100 is in the form of a corrugation or flute 116, it acts as a vertical tube that substantially prevents the air from exiting the exposed side (second side 96 as illustrated) or the denser wastewater or sludge 26 from entering the exposed, second side 96 of the corrugated sheet 84 when the sheet is joined with others or any optional substantially planar interstitial sheets into an assembly according to the present invention.

In other embodiments described in more detail below, the unitarily formed baffle 100 may be a substantially flat generally vertical extension extending in a direction generally perpendicular to the plane corresponding to the peaks of the corrugations or to the valleys of the corrugations and extending at least the thickness "t" of the sheet. The substantially flat generally vertical extension is joined with like extensions on adjacent sheets and together with the last corrugation 98 adjacent the exposed side, such as the second side 96 of the sheet 84 forms a vertical tube or barrier that substantially the air from exiting from the exposed, second side 96 of the corrugated sheet 84 or the denser wastewater or sludge 26 from entering the exposed second side 96.

After the corrugated sheets 84 are made, they are usually stacked horizontally in a nested fashion to save space for storage and shipping with the front surface 86 of the bottom sheet down, such that the front surface 86 of the second sheet is against the rear surface 88 of the bottom sheet, and so on. However, in use in an assembly 40 of the sheets 84 as wastewater or sludge distribution media to support biomass that forms biofilm on surfaces within the assembly 40, the corrugated sheets 84, with or without, but preferably with the use of the optional substantially planar interstitial sheets between each of the corrugated sheets 84, are in a vertical orientation as shown in a first embodiment 118 of an assembly 40, depicted in FIGS. 7 and 8, using the first embodiment of the corrugated sheets 84 shown in FIG. 6 and described above. Since the use of the optional substantially planar interstitial sheets is preferred and therefore is shown at 132 in each of the embodiments of the assemblies 40, for the sake of readability, the term "optional" in describing the substantially planar sheets 132 usually will be eliminated hereinafter.

FIG. 7 is a rear second side isometric view of one embodiment of an assembly 118 according to the present invention corresponding to the generic assemblies 40 according to the present invention shown in FIGS. 1 and 2, using the first embodiment of the corrugated sheets 84 having a unitarily formed baffle 100 as shown in the embodiment of FIG. 6. FIG. 8 is a front first side isometric view of the embodiment of the assembly 118 shown in FIG. 7.

With reference to FIGS. 7 and 8, the assembly 118 is formed by arranging the corrugated sheets 84 so that the facing corrugations 98 are at opposing angles to form channels with respect to each other and with respect to the substantially planar interstitial sheets 132, and for translation of the wastewater or sludge and any entrained air from a single point source to two or more point sources and subsequent redistribution above in the assembly 118 of the corrugated sheets 84. This is simply accomplished by using the same corrugated sheets 84 and rotating them so that the front face 86 of a front corrugated sheet 84*a* is against the front surface 86 of a second corrugated sheet 84*b*, and the rear surface 88 of the second corrugated sheet 84*b* is against the rear face 88 of the third corrugated sheet 84*c*, and so forth, until the last corrugated sheet designated 84*z* is attached. By using the designation "84*z*" for the last sheet, as shown in FIGS. 7 and 8 as being at the rear of the assembly 118, it does not mean or imply that 26 sheets 84 are used in the assembly 118. The positioners 106 on the corrugations 98 of the corrugated sheets 84 help align the corrugated sheets 84 together, and the offsets 108 help align the substantially planar interstitial sheets 132 between the corrugated sheets. The assembly 40, 118 is usually assembled with the sheets lying generally horizontally on top of each other, with each successive top sheet bonded to the sheet below it.

The bonding can be by adhesive bonding with glue or solvent bonding, by melt bonding or sonic bonding, for example. Typically, adhesive bonding or solvent bonding is used, where glue or solvent is applied at least to the positioners 106 and to the offsets 108 of the peaks 102 and valleys 106 (the peaks and valleys also referred to generically as "apices"), or along the entireties of the apices of the corrugations 98 on one side of a corrugated sheet 84 such as by a roller; and the next adjacent sheet or 84 is laid atop the first sheet such that the corrugations 98 of the two sheets cross. Substantially planar interstitial sheets 132 may be, and preferably are used, as described below. The apices of the corrugations 98 may be slightly flattened to provide an enlarged bonding surface. When the sheets are thermoformed from unplasticized PVC, a solvent may be used to weld together the apical contacting portions of the corrugations 98 on each of the sheets. Residual solvent is allowed to evaporate from the non-contacting portions of the sheets.

The assembly 118 has a front 120, a rear 122, a top 124, a bottom 126, a first side 128 and a second side 130, with a height "H," a width "W" and a thickness "T." The thickness "T" is defined by the number of sheets 84 and 132 that are used in the assembly 118. Typically, to make the assembly easy to handle and fit within basins 12 of typical dimensions, the assembly 118 has a height "H" of about 2 feet (about 0.61 meter), a width "W" of about 4 feet (about 1.21 meters) and, a thickness "T" of about 2 feet (about 0.61 meter), but the dimensions can vary widely.

When substantially planar interstitial sheets 132 are used, they may extend either the for the entire height "H" of the assembly 118 or preferably only extend along a bottom portion 112, typically about half of the of the height "H" of the assembly 118 shown as the bottom portion 136, about half of the height "H" from the bottom 126 of the assembly 118.

The assembly 118 shows how the unitarily formed baffles 100, in this embodiment, generally vertical corrugations or flutes 116, of adjacent corrugated sheets 84, such as sheets 84*a*, 84*b* and 84*c*, for example, with their respective unitarily formed baffles 100*a*, 100*b* and 100*c*, are joined together along the flanges 114 and 115 to form bonded areas 138. Depending on the number of the corrugated sheets 84 are used in an assembly 118, there may be unbonded baffles, such as baffle 100*a*, forming the front 120 of the assembly 118 which could bear against the inside front wall of a basin 12 in which stacks of the assemblies forming towers 38 are located, often in groups of multiple assemblies. Similarly, bonded areas 140 are formed where the flanges 114 and 115 are bonded to the substantially planar interstitial sheets 132. When bonded together along the second side 130 of the assembly 118, the baffles form generally vertical tubes 142 that substantially block air from exiting or the denser wastewater or sludge being treated from entering the second side 130 of the assembly.

Figure 9:
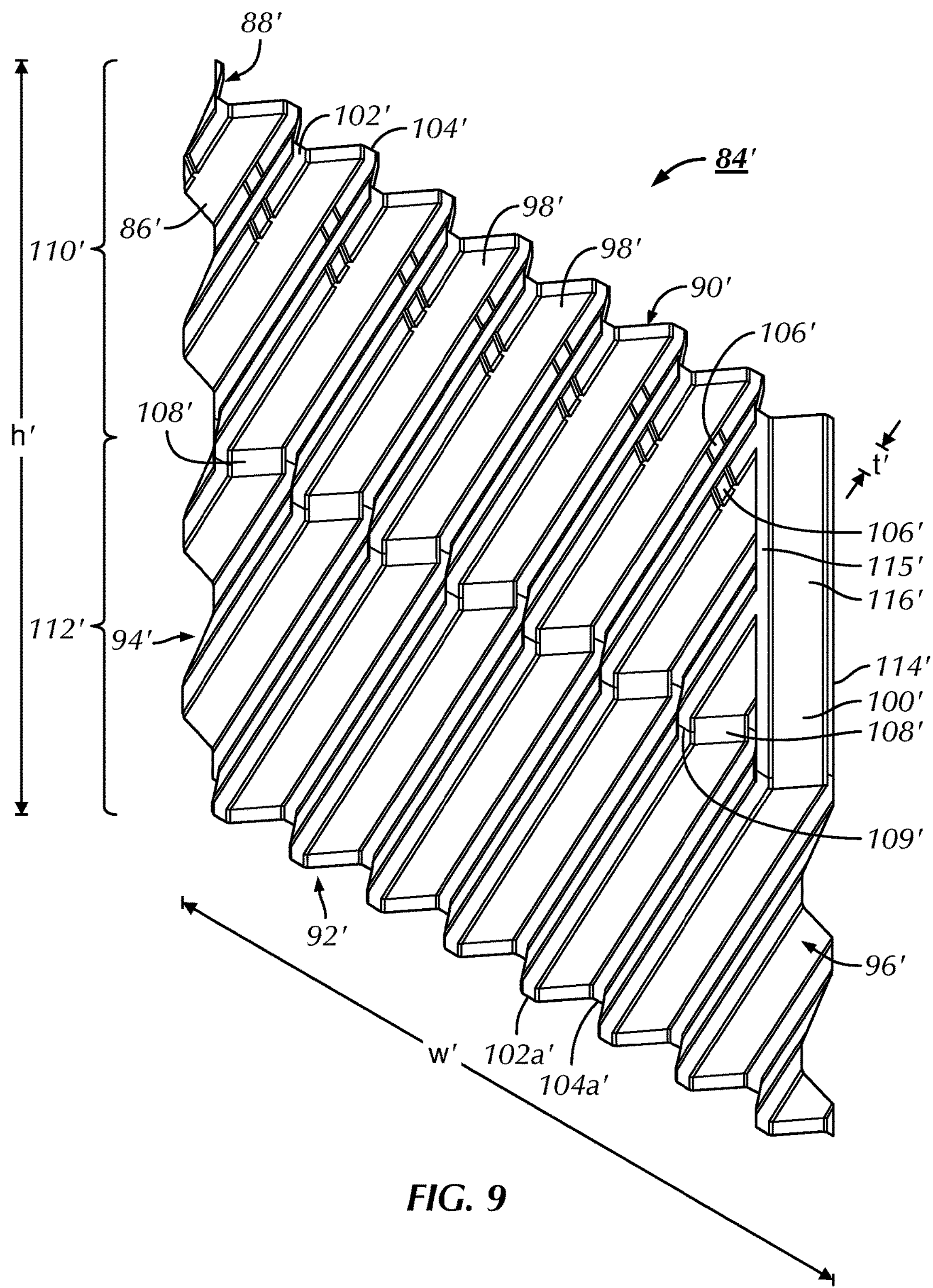
FIG. 9 is a rear second side isometric view of another embodiment of a corrugated sheet having a unitarily formed baffle according to the present invention.

FIG. 9 is a rear second side isometric view of a second embodiment of a corrugated sheet 84' having a unitarily formed baffle 100' according to the present invention. It will be apparent by reviewing FIGS. 6 and 9 that the corrugated sheet 84' illustrated in FIG. 9 has a great many of the same structural elements as the corrugated sheet 84 illustrated in and described in detail above with respect to FIG. 6. Accordingly, elements of the sheet 84' that are the same or equivalent to elements of the sheet 84 will be identified by primed numerals, and will not be described again with respect to the sheet 84', except where it is necessary to understand the distinctions between the two embodiments.

The corrugated sheet 84' is very similar to the corrugated sheet 84, with the exception of the unitarily formed baffle 100'. In the corrugated sheet 84 of FIG. 6, the baffle 100 in the form of a generally vertical corrugation or flute 116 extends along the second side 96 of the sheet 84 for the height "h" of the sheet. However, in the corrugated sheet 84' of FIG. 9, the baffle 100' in the form of a generally vertical corrugation or flute 116' extends along the second side 96' of the sheet 84' for only the top portion 110' for about the top half of the height "h'" of the sheet. As in the other disclosed embodiments, the baffle 100 will be unitarily formed on whichever side or sides of the sheet 84' is or are to be exposed to the denser wastewater or sludge when formed into assemblies like assemblies 40', 118' (see FIGS. 10 and 11). As before, the baffle 100 is illustrated on only the second side 96' for the sake of convenience and ease of understanding. In the embodiment of FIG. 9, less material, including less glue or solvent, is used than in the embodiment of FIG. 6, resulting in some savings in materials and labor, without adversely affecting performance of assemblies containing the sheets 84', since in distribution media, the bottom portion 112', about the bottom half of the assembly using the sheets 84', does not allow for lateral communication of the air and wastewater or sludge being treated, as the substantially planar interstitial sheets that extend between the sheets at the bottom portion 112' substantially eliminates communication between sheets 84'.

Figure 10:
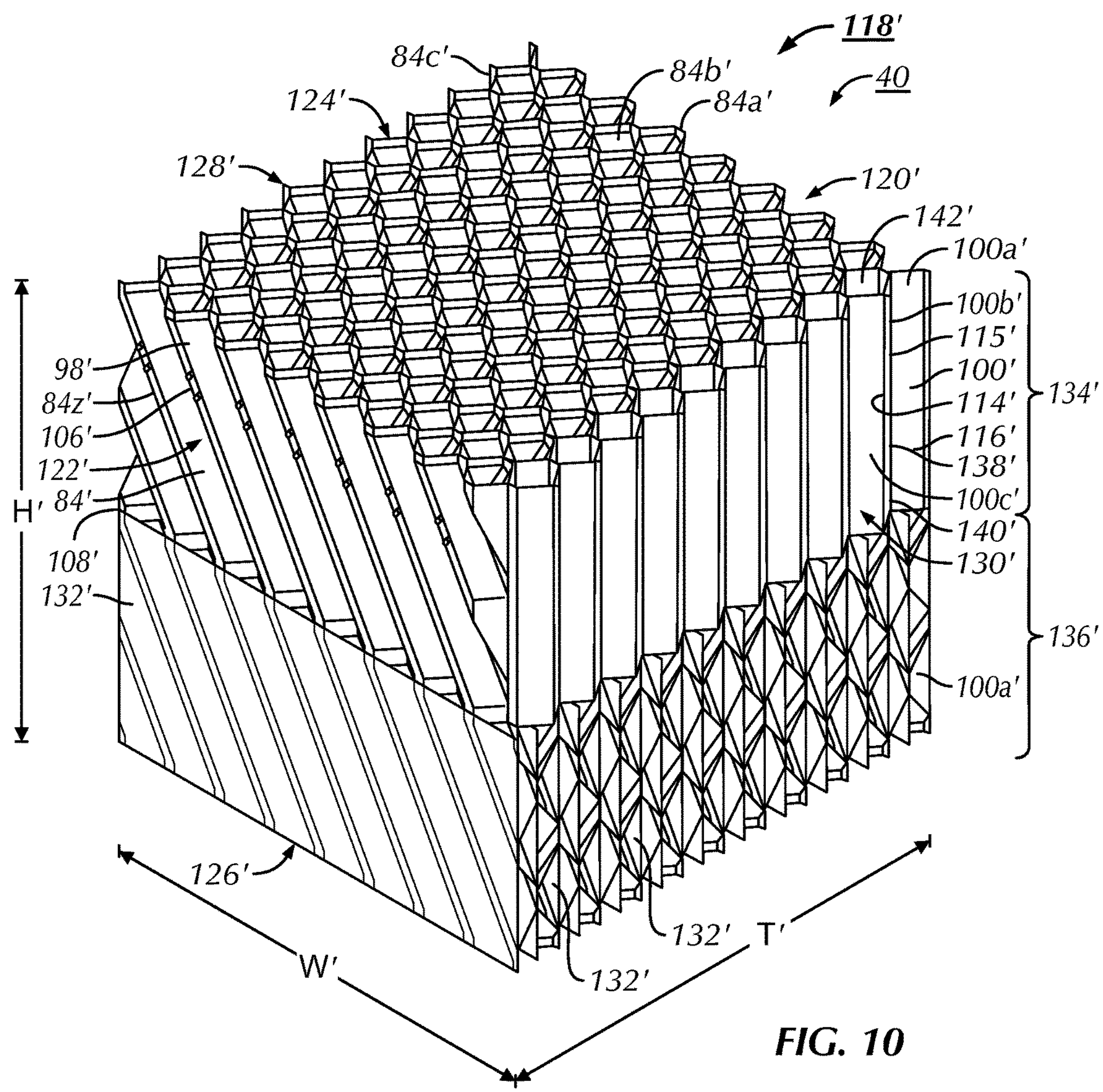
FIG. 10 is a rear second side isometric view of another embodiment of an assembly according to the present invention using the corrugated sheets having a unitarily formed baffle as shown in FIG. 9.
Figure 11:
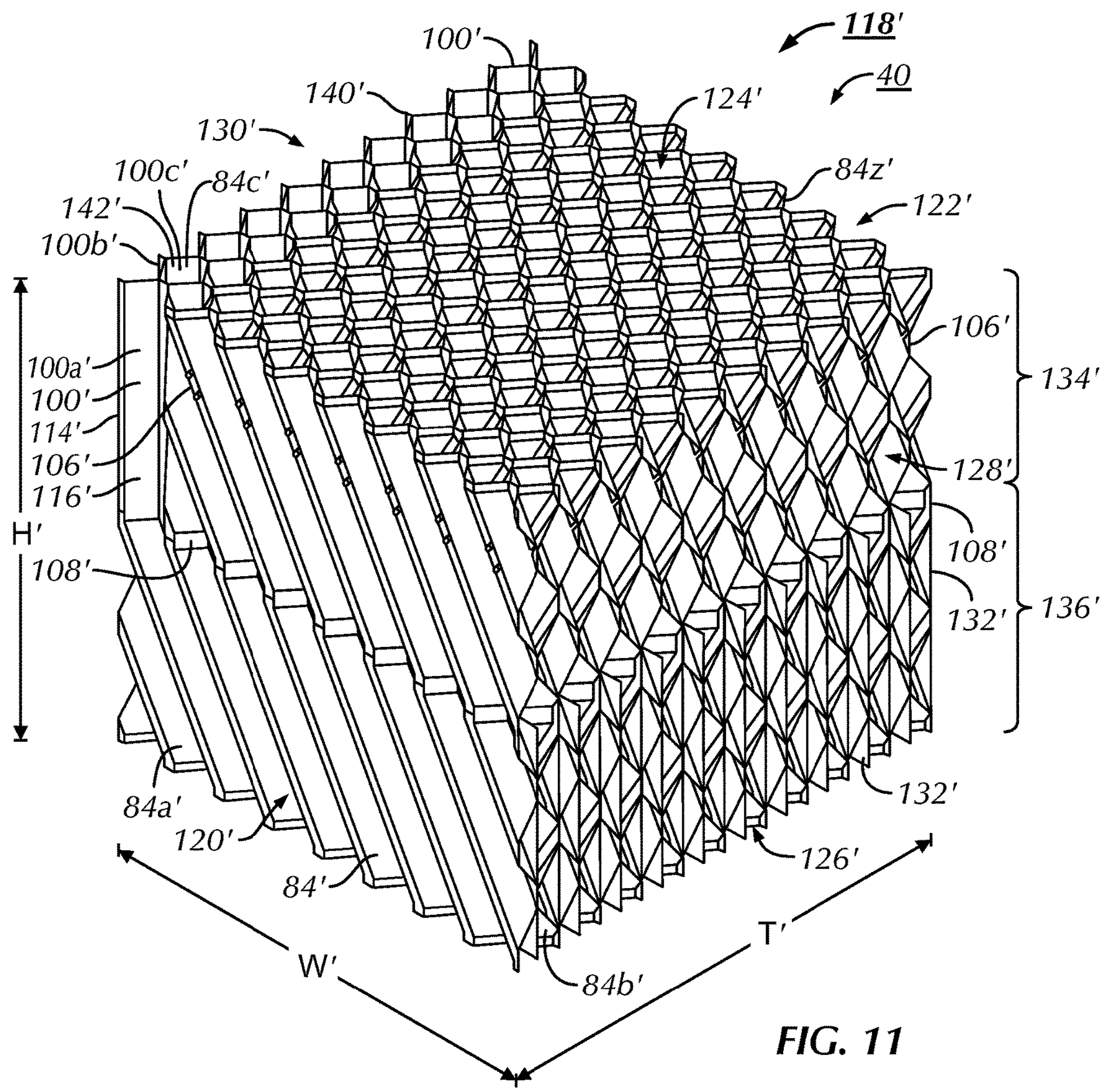
FIG. 11 is a front first side isometric view of the embodiment of the assembly shown in FIG. 10.

FIGS. 10 and 11 illustrate the use of the second embodiment of the sheets 84' to make a wastewater or sludge cross-flow distribution media assembly 118'. FIG. 10 is a rear second side isometric view of a second embodiment of an assembly 118' according to the present invention using the corrugated sheets 84' having a unitarily formed baffle 100' as shown in FIG. 9, and FIG. 11 is a front first side isometric view of the second embodiment of the assembly 118' shown in FIG. 10.

In a manner similar to the explanation of the corrugated sheets 84 and 84' of FIGS. 6 and 9, respectively, since the assembly 118' of FIGS. 10 and 11 has a great many of the same structural elements as the assembly 118 illustrated in and described in detail above with respect to FIGS. 7 and 8, elements of the assembly 118' that are the same or equivalent to elements of the assembly 118 will be identified by primed numerals, and will not be described again with respect to assembly 118', except where it is necessary to understand the distinctions between the two embodiments.

The second embodiment of the assembly 118' shown in FIGS. 10 and 11 is very similar to the first embodiment of the assembly 118 shown in FIGS. 7 and 8, except for the relative height and location of the unitarily formed baffle 100' in assembly 118'. Due to the use of the corrugated sheets 84' in the assembly 118', the generally vertical corrugations or flutes 116' formed when the flanges 114' on adjacent sheets 84' are bonded together, form, in essence, generally vertical tubes 142' along the exposed second side 130' of the assembly 118' extending downward from the top 124' at the top portion 134', for about the top half of the height "H'" of the assembly 118'. As explained above with respect to the location of the unitarily formed baffle 100' on the sheet 84', having the generally vertical tubes 142' along only the top portion 134' of the exposed second side 130' of the assembly 118' does not adversely affect the ability of the baffles to substantially block air from exiting or the denser wastewater or the sludge being treated from entering the exposed second side 130' of the assembly 118'. At the same time, it saves on material and labor costs.

Figure 12:
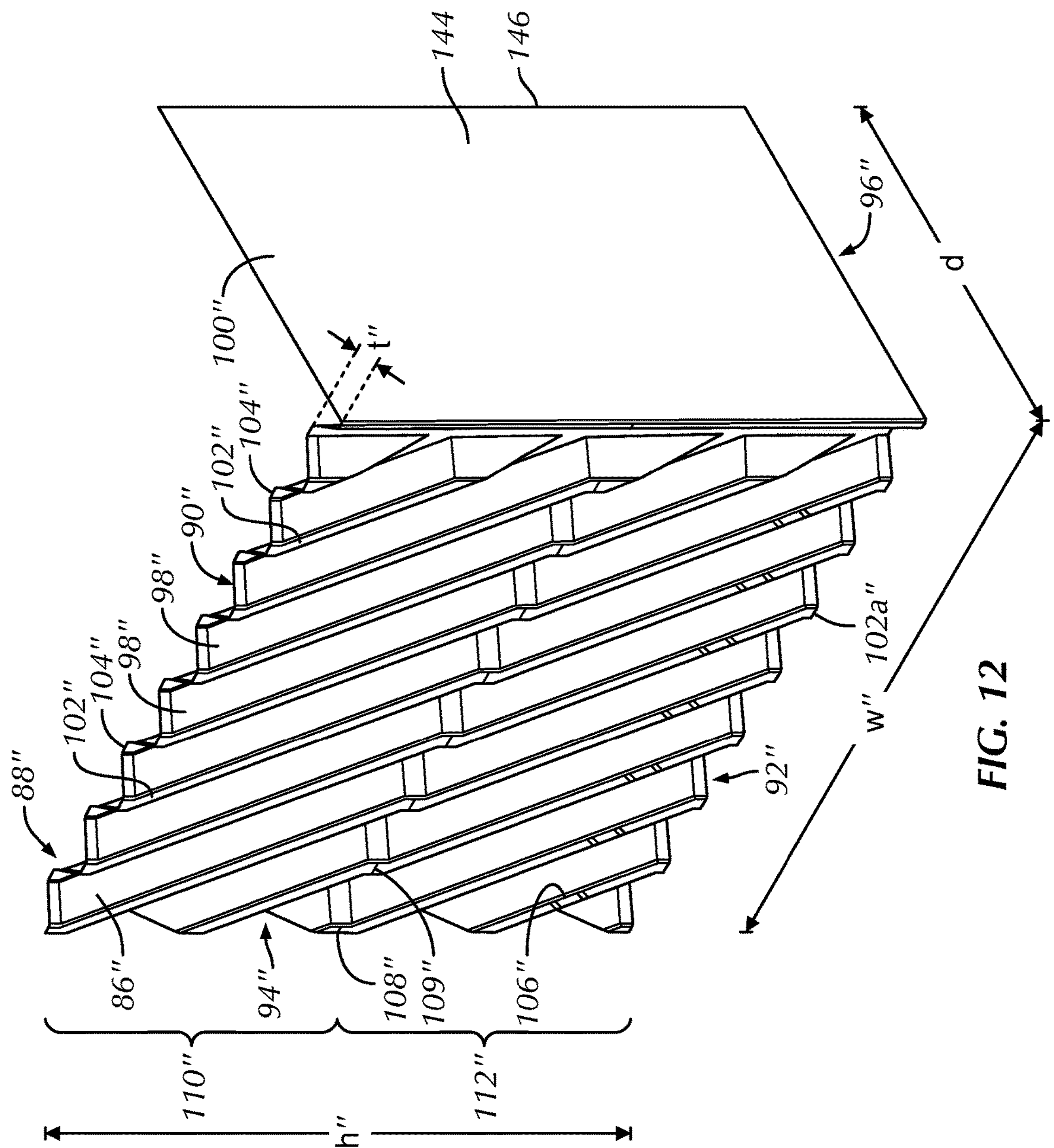
FIG. 12 is a rear second side isometric view of yet another embodiment of a corrugated sheet having a unitarily formed baffle according to the present invention.

FIG. 12 is a rear second side isometric view of a third embodiment of a corrugated sheet 84" having a unitarily formed baffle 100" according to the present invention. Like the second embodiment of the corrugated sheet 84' shown in FIG. 9, the third embodiment of the corrugated sheet 84" illustrated in FIG. 12 also has a many of the same structural elements as the corrugated sheets 84 of the first embodiment and corrugated sheet 84' of the second embodiment, respectively illustrated in FIGS. 6 and 9, and described in detail above with respect to FIG. 6. Accordingly, elements of the third embodiment sheet 84" that are the same or equivalent to elements of the sheet 84 of FIG. 6 will be identified by double primed numerals, and will not be described again with respect to the sheet 84", except where it is necessary to understand the distinctions between and among the embodiments.

The third embodiment of the corrugated sheet 84" of FIG. 12 has the elements of the first and second embodiments of corrugated sheets 84 and 84', including a unitarily formed baffle 100" to substantially block air from exiting or the denser wastewater or sludge being treated from entering the exposed second side 96" of the sheet 84". However, the baffle 100" is in a different configuration than the configuration of baffles 100 and 100' of the previously-described embodiments.

The unitary baffle 100" may have several configurations, only one of which need be shown for understanding all of its configurations. With reference to FIG. 12, a first configuration of unitary baffle 100" is shown in the form of a substantially flat generally vertical extension 144 having a free edge 146 and extending in a direction generally perpendicular to the plane corresponding to the peaks 102" of the corrugations 98" or to the valleys 104" of the corrugations 98" and extending for a distance "d" at least the thickness "t" of the sheet 84". As shown in FIG. 12, the free edge 146 of the substantially flat generally vertical extension 144 (hereinafter simply the "flat vertical extension 144" for the sake of readability) extends for a distance "d" considerably farther than the thickness "t" of the sheet 84". In this first embodiment, as will be made more clear with respect to the assembly 118", best seen in FIGS. 13-16, the assembly 118" of corrugated sheets includes two sheets 84", one as the front sheet **84*a*" of the assembly 118" and the other as rear sheet 84*z*" of the assembly 118". The distance "d" allows for a considerable overlap 150 of the free edges of the opposed free edges 146 of the flat vertical extension 144 to an extent "x" (see FIG. 15) that allows good bonding of the flat vertical extension 144 to each other to provide an effective barrier to substantially block air from exiting or the denser wastewater or sludge being treated from entering the exposed second side 130" of the assembly 118". The flat vertical extensions 144 could also be bonded to the second side edges of the intermediate corrugated sheets 54" like corrugated sheets 54 of the prior art assemblies 52 and any optional substantially planar interstitial sheets 132 that may be desired. However, this additional bonding to the second side edges of such intermediate corrugated sheets 54" is not believed to be necessary to provide an effective cross-flow wastewater or sludge distribution media assembly 118"** according to the present invention.

In the first configuration, the height of the flat vertical extension 144 is to the extent of the height "h" of the corrugated sheet 84". A second configuration of the third embodiment of the corrugated sheet 84" with a unitarily formed baffle 100" in the form of the flat vertical extension 144 is a configuration in which the height of the flat vertical extension 144 is not to the full extent of the height "h" of the corrugated sheet 84". Instead, in the second configuration, the flat vertical extension 144 extends only along the top portion 110" or about halfway down from the top 90" of the exposed second side 96" of the sheet 84", particularly if the substantially planar interstitial sheets 132" are used on the bottom portion 112" about halfway up from the bottom 92" of the sheet 84".

In a third configuration of the third embodiment of the corrugated sheet 84" having a unitarily formed baffle in the form of the flat vertical extension 144, the free edge 146 extends for a distance "d" only slightly greater than the thickness "t" of the sheet 84". In this third configuration, all of the corrugated sheets of an assembly 118" would have the same construction, not only the front corrugated sheet **84*a*" and the rear corrugated sheet 84*z*" as in the first configuration. In this third configuration, the free edges 146 of the flat vertical extensions 144 unitarily formed on all of the corrugated sheets 84" used in an assembly 118" would overlap to a small extent, each with the adjacent free edge 146 so provide a strong structure when bonded together. Also in the third configuration, the height of the flat vertical extension 144 is to the extent of the height "h" of the corrugated sheet 84". In view of the effort and additional glue used to bond all of the many free edges 146** together, while workable, this configuration may be less desirable than the first or second configurations.

A fourth configuration of the third embodiment of the corrugated sheet 84" having a unitarily formed baffle 100" in the form of the flat vertical extension 144 is like the third configuration, except that the flat vertical extension 144 does not have a height extending to the full extent of the height "h" of the corrugated sheet 84". Instead, in the fourth configuration, the flat vertical extension 144 extends only along the top portion 110" or about halfway down from the top 90" of the exposed second side 96" of the sheet 84", particularly if the substantially planar interstitial sheets 132" are used on the bottom portion 112" about halfway up from the bottom 92" of the sheet 84". This would reduce the amount of material needed to make the corrugated sheet 84" and the amount of glue needed compared to the full height of the third configuration, yet still provide an effective cross-flow wastewater or sludge distribution media assembly 118" according to the present invention.

A fifth configuration of the third embodiment of the corrugated sheet 84" having a unitarily formed baffle 100" in the form of the flat vertical extension 144 is like the first configuration, where the free edge 146 extends further to provide the sole baffle or barrier along the second side 130" of the assembly 118". In this fifth configuration, the distance "d" of the flat vertical extension 144 to its free edge 146 could actually equal the entire thickness "T" of the second side 130" of an assembly 118" or somewhat more to allow an overlap to the front 120" or the rear 122" of the assembly 118", depending on how many intermediate corrugated sheets 54" like the prior art corrugated sheets 54 are present in the assembly 118". In this fifth configuration, the need for a separate baffle plate like baffle plate 66 of the prior art assemblies 52 would be eliminated, but due to the size of the distance "d" of the flat vertical extension 144, the size could be unwieldy, even if a workable assembly could be formed, so this third configuration is not as desirable as the first or second configuration.

A sixth configuration of the third embodiment of the corrugated sheet 84" having a unitarily formed baffle 100" in the form of the flat vertical extension 144 is like the fifth configuration, except that the flat vertical extension 144 does not have a height extending to the full extent of the height "h" of the corrugated sheet 84". Instead, in the sixth configuration, the flat vertical extension 144 extends only along the top portion 110" or about halfway down from the top 90" of the exposed second side 96" of the sheet 84", particularly if the substantially planar interstitial sheets 132" are used on the bottom portion 112" about halfway up from the bottom 92" of the sheet 84".

An assembly 118" made of the third embodiment of the corrugated sheet 84" having a unitarily formed baffle 100" in the form of the flat vertical extension 144 will now be described with reference to FIGS. 13-16. Only the first configuration of the third embodiment will be discussed in detail, as it would be clear how to make and use any of the second through sixth configurations in view of the explanation of the first configuration. Moreover, due to the similarity of many of the structural elements of the third embodiment of the assembly 118" compared to the first and second embodiments 118 and 118', some of the part numbers of like elements have not been included for the sake of clarity, but elements of the assembly 118" that are the same or equivalent to elements of the assemblies 118 and 118' necessary for an understanding will be identified by double primed numerals, along with any other explanation necessary to understand the structure and function of the third embodiment of the assembly 118" and its distinctions among the first and second two embodiments of the assemblies 118 and 118'.

Figure 13:
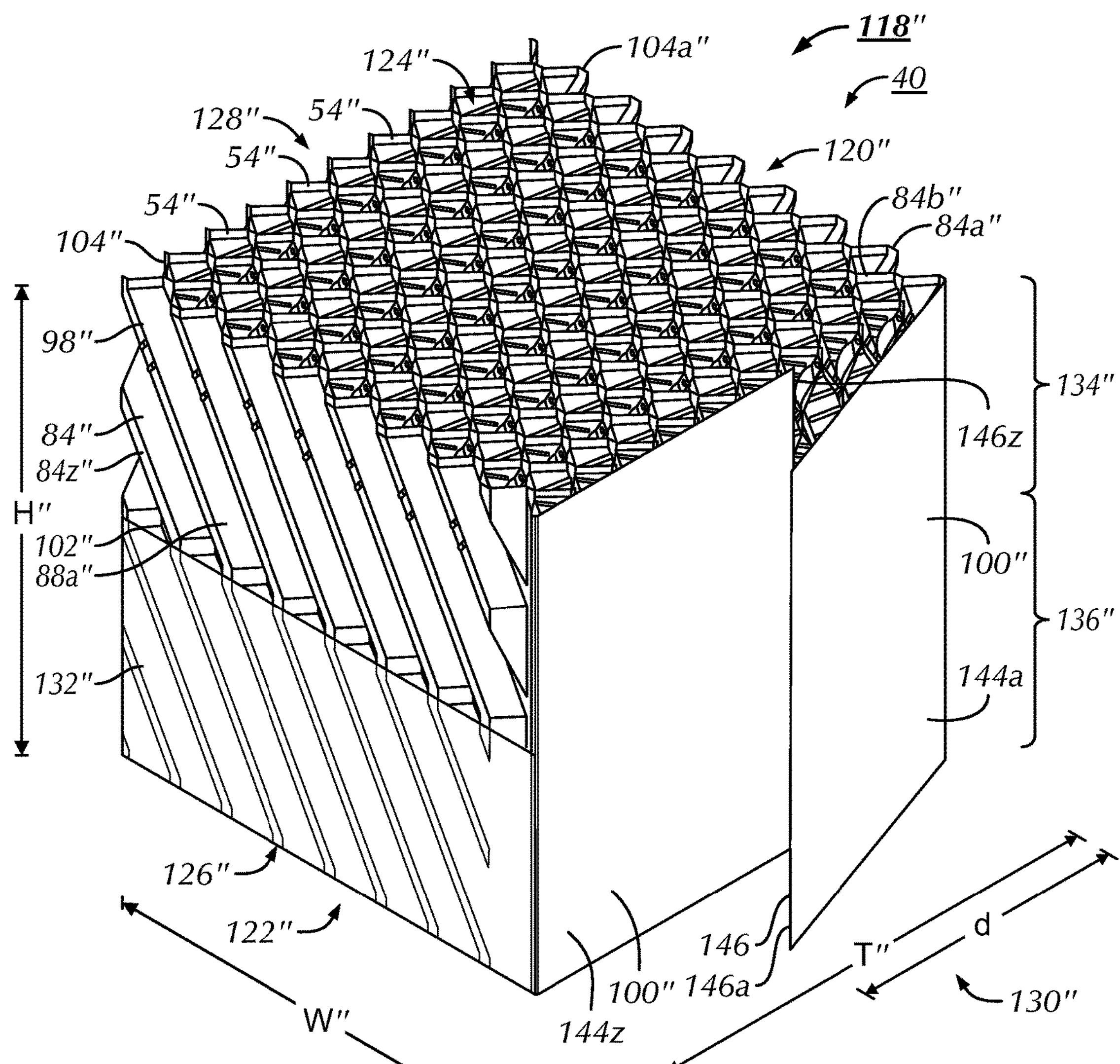
FIG. 13 is a rear second side isometric view of another embodiment of a partially assembled assembly according to the present invention using front and rear corrugated sheets having a unitarily formed baffle as shown in FIG. 12.
Figure 14:
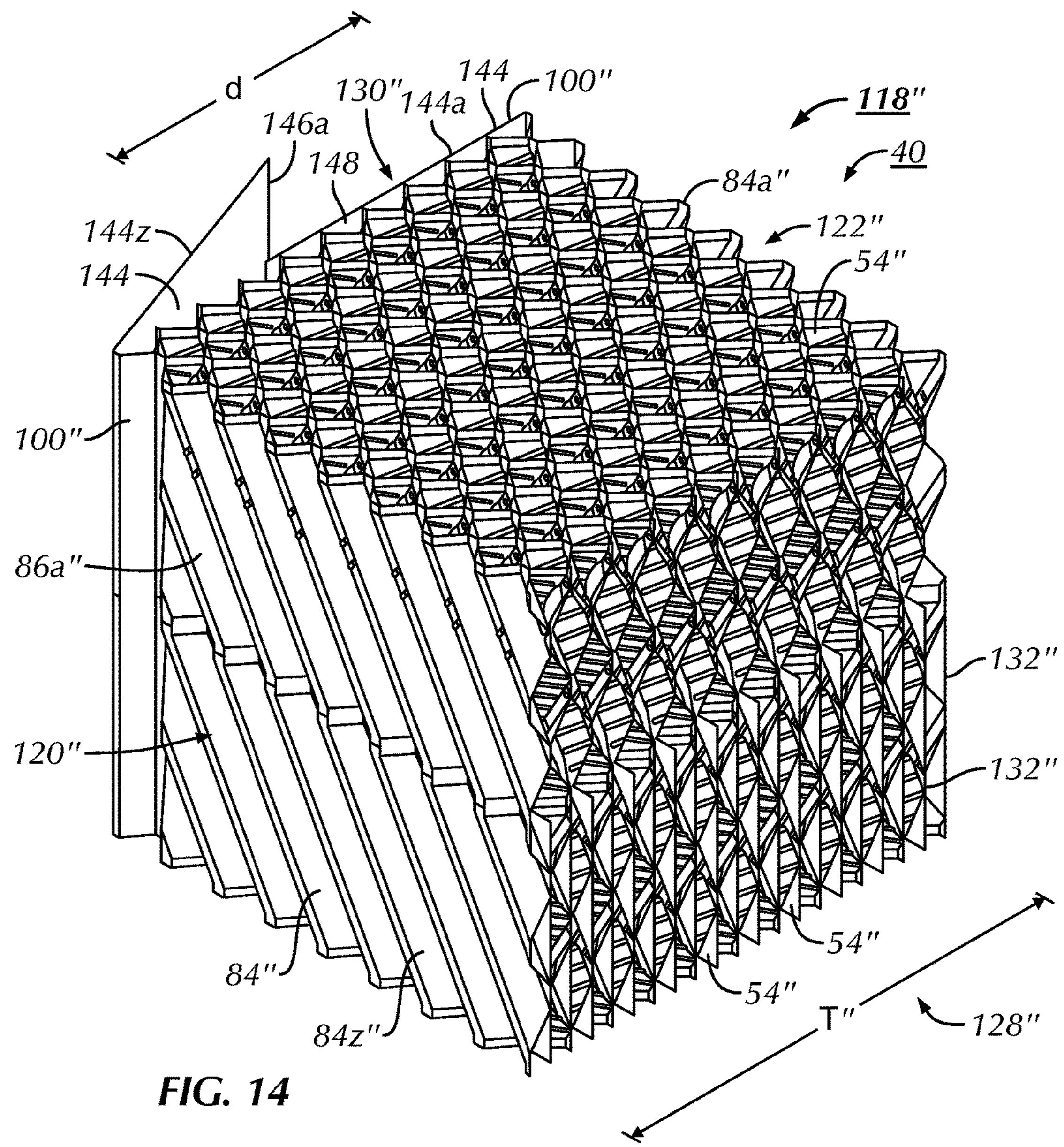
FIG. 14 is a front first side isometric view of the embodiment of the partially assembled assembly shown in FIG. 13.
Figure 15:
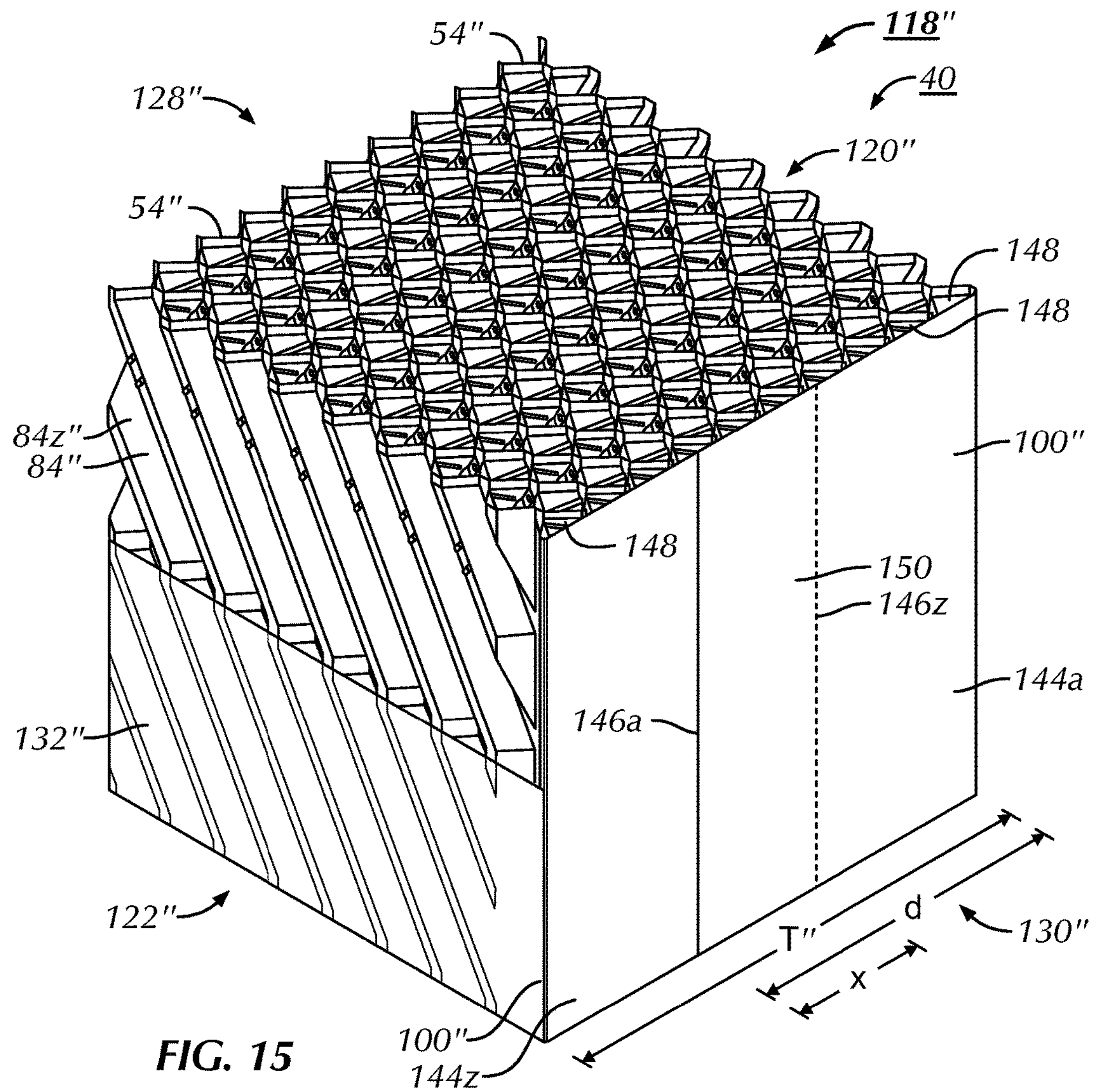
FIG. 15 is a rear second side isometric view of the embodiment of a fully assembled assembly shown in FIG. 13.
Figure 16:
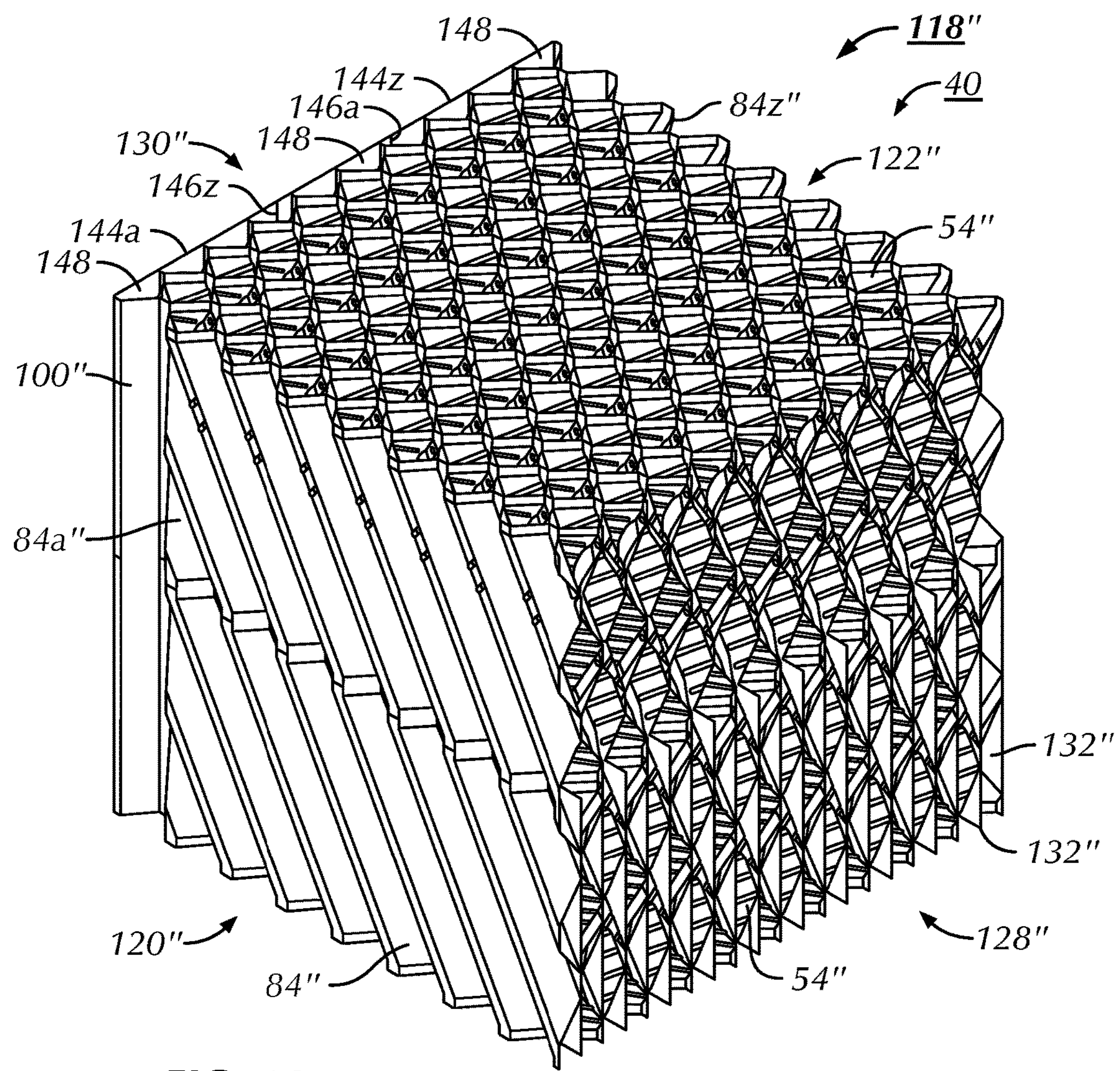
FIG. 16 is a front first side isometric view of the embodiment of the fully assembled assembly shown in FIG. 13.

FIG. 13 is a rear second side isometric view of a partially assembled assembly 118" according to the present invention using a front corrugated sheet **84*a*" and a rear corrugated sheet 84*z*" having a unitarily formed baffle 100" in the form of the flat vertical extension 144 as shown and described with respect to in FIG. 12. FIG. 14 is a front first side isometric view of the embodiment of the partially assembled assembly 118" shown in FIG. 13. FIG. 15 is a rear second side isometric view of the embodiment of a fully assembled assembly 118" shown in FIG. 13. FIG. 16 is a front first side isometric view of the embodiment of the fully assembled assembly 118 shown in FIG. 13**.

The assembly 118" for supporting biomass for treating wastewater or sludge comprises a plurality of corrugated sheets of material 54" and 55" corresponding to the prior art corrugated sheets 54 and 55, respectively. Optional, but preferred substantially planar sheets of material 132" are arranged between adjacent corrugated sheets 54" and 55". The assembly 118" has a front 120" defined by a front surface **86*a*" of a front corrugated sheet 84*a*", a rear 122" defined by a rear surface 88*a*" of a rear corrugated sheet 88", a top 124", a bottom 126", a first side 128", a second side 130", a height "H" extending from the bottom 126" to the top 124", a width "W" extending from the first side 128" to the second side 130" and a thickness "T" extending from the front 120" to the rear 122" of the assembly 118"**.

The front corrugated sheet **84*a*" comprises a unitarily formed baffle 100" along at least a top portion 134", and as illustrated in FIGS. 13-16, for the full height "H", of the second side 130" of the corrugated sheet 84*a*" in the form of the flat vertical extension 144, 144*a* that extends in a direction generally perpendicular from the plane corresponding to the peaks 102" on the front surface 86*a*" of the front corrugated sheet 84*a*" to a free edge 146, 146*a* that extends a distance "d" of at least slightly more than half of the thickness "T" of the assembly 118" The rear corrugated sheet 84*z*" is in a form of the front corrugated sheet 84*a*" of the assembly 118" that is rotated 180° front to rear, such that the free edge 146, 146*z* of the flat vertical extension 144, 144*z* of the rear corrugated sheet 84*z*" overlaps with the free edge 146*a* of the flat vertical extension 144*a* of the front corrugated sheet 84*a*" to an extent "x" (see FIG. 15) that allows good bonding of the overlapping portions 150 of the flat vertical extension 144 to each other to substantially block air from exiting or the denser wastewater or sludge being treated from entering the exposed second side 130" of the assembly 118"**.

The flat vertical extensions 144 could also be bonded to the exposed second side 130" edges of the intermediate corrugated sheets 54" between the front corrugated sheet **84*a*" and the rear corrugated sheet 84*z*" and any substantially planar interstitial sheets 132" that may be desired. However this additional bonding to the exposed second side edges of such intermediate corrugated sheets is not believed to be necessary to provide an effective cross-flow wastewater or sludge distribution media assembly 118"** according to the present invention.

As best seen in the fully assembled views of the assembly 118" shown in FIGS. 15 and 16, when the overlapping portions 150 of the flat vertical extensions **144*a* and 144*z* are bonded together, vertical channels 148 are created between the edges of the corrugated sheets 54", 84*a*" and 84*z*" at the second side 130" of the assembly and the flat vertical extensions 144** that have a generally triangular cross-section in a top plan view.

As mentioned above with respect to the explanation of the various configurations of the third embodiment of the corrugated sheet of FIG. 12, any of the configurations could be used with minor modifications in view of the descriptions and explanations above to make an assembly 118" providing an effective barrier to substantially block air from exiting or the denser wastewater or sludge being treated from entering the exposed second side 130" of the assembly 118", while at the same time effectively treating such wastewater or sludge.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A wastewater or sludge treatment fixed film cross-flow distribution media sheet (84, 84') comprising a corrugated sheet of material having a front surface (86, 86"), a rear surface (88, 88'), a top (90, 90'), a bottom (92, 92'), a first side (94, 94'), a second side (96, 96'), a width (w, w') extending from the first side to the second side, either or both of the first side (94, 94') and second side (96, 96') being an exposed side or sides of the corrugated sheet, the exposed side or sides to be exposed to wastewater or sludge that is denser outside of the width of the corrugated sheet than wastewater or sludge within the width of the corrugated sheet, and a height (h, h') extending from the bottom to the top, the corrugations (98, 98') being present in the front and rear surfaces with peaks (102, 102') at the front surface and valleys (104, 104') at the rear surface, the corrugations being angled corrugations that are at an angle of about 10° to about 80° with respect to the top and the bottom of the corrugated sheet, the corrugations being generally linear from the top to the bottom of the corrugated sheet, the corrugated sheet having a thickness (t, t') extending from a plane corresponding to the peaks of the corrugations on the front surface to a plane corresponding to the valleys of the corrugations on the rear surface, the corrugated sheet further comprising a unitarily formed baffle (100, 100') along the exposed side or sides of the corrugated sheet, the baffle (100, 100') being a generally vertical corrugation (116, 116') extending generally vertically along the exposed side or sides from the top (90, 90') downwardly to a point at least about half the height (h') of the corrugated sheet, the baffle extending at least for the thickness (t, t') of the corrugated sheet, the baffle (100, 100') having a free edge and an edge where the baffle joins the corrugated sheet (84, 84'), the generally vertical corrugation (116, 116') that is the baffle having a flange (114, 114') formed along the free edge and a flange (115, 115') formed along the edge of the corrugated sheet (84, 84') where the baffle joins the corrugated sheet, the baffle (100, 100') being sufficient, when bonded to either a like baffle on a like sheet or a substantially planar sheet (132, 132') positioned adjacent the front or rear surface, to substantially block air from exiting the exposed side or sides of the corrugated sheet and the substantially planar sheet or the denser wastewater or sludge being treated from entering the exposed side or sides of the corrugated sheet and the substantially planar sheet.

2. The distribution media sheet (84) of claim 1, wherein the baffle (100) extends along the exposed side or sides of the corrugated sheet for the height (h) of the corrugated sheet.

3. The distribution media sheet (84') of claim 1, wherein the baffle (100') extends along the exposed side or sides (96') of the corrugated sheet for about a top half (110') of the height (h') of the corrugated sheet.

4. The distribution media sheet (84, 84') of claim 1, wherein the flange (114, 114') formed along the free edge is on the plane corresponding to the valleys of the corrugations on the rear surface and the flange (115, 115') formed along the edge of the corrugated sheet where the baffle joins the corrugated sheet is on the plane corresponding to the peaks of the corrugations on the front surface.

5. A wastewater or sludge treatment fixed film cross-flow distribution media sheet (84") comprising a corrugated sheet of material having a front surface (86"), a rear surface (88"), a top (90"), a bottom (92"), a first side (94"), a second side (96"), a width (w") extending from the first side to the second side, either or both of the first side (94") and second side (96") being an exposed side or sides of the corrugated sheet, the exposed side or sides to be exposed to wastewater or sludge that is denser outside of the width of the corrugated sheet than wastewater or sludge within the width of the corrugated sheet, and a height (h") extending from the bottom to the top, the corrugations (98") being present in the front and rear surfaces with peaks (102") at the front surface and valleys (104") at the rear surface, the corrugations being angled corrugations that are at an angle of about 10° to about 80° with respect to the top and the bottom of the corrugated sheet, the corrugations being generally linear from the top to the bottom of the corrugated sheet; the corrugated sheet having a thickness (t") extending from a plane corresponding to the peaks of the corrugations on the front surface to a plane corresponding to the valleys of the corrugations on the rear surface, the corrugated sheet further comprising a unitarily formed baffle (100") along the exposed side or sides of the corrugated sheet, the baffle (100") having a substantially flat generally vertical extension (144), the substantially flat generally vertical extension (144) extending in a direction generally perpendicular to the plane corresponding to the peaks (102") of the corrugations (98") or to the plane corresponding to the valleys (104") of the corrugations (98") and extending at least the thickness (t") of the corrugated sheet, and extending generally vertically along the exposed side or sides of the corrugated sheet for at least about a top half (110") of the height (h") of the corrugated sheet from the top (90") downwardly to a point at least about half the height (h") of the corrugated sheet, the baffle (100") being sufficient, when bonded to either a like baffle on a like sheet or a substantially planar sheet (132") positioned adjacent the front or rear surface, to substantially block air from exiting the exposed side or sides of the corrugated sheet or the denser wastewater or sludge being treated from entering the exposed side or sides of the corrugated sheet and the substantially planar sheet.

6. The distribution media sheet (84") of claim 5, wherein the substantially flat generally vertical extension (144) extends in a direction generally perpendicular to and from the peaks (102") on the front surface (86") to a free edge (146) that is beyond the valleys (104") on the rear surface (88").

7. The distribution media sheet of claim 5, wherein the free edge (146) of the substantially flat generally vertical extension (144) extends a distance (d) of at least twice the thickness (t") of the corrugated sheet.

8. The distribution media sheet (84") of claim 5, wherein the generally vertical extensions (**144*a*", 144*z*") of the front and rear corrugated sheets (84*a*", 84*z*") extend along the exposed side or sides (96"**) of the corrugated sheet for the height (h") of the corrugated sheet.

9. The distribution media sheet (84") of claim 5, wherein the generally vertical extensions (**144*a*", 144*z*") of the front and rear corrugated sheets (84*a*", 84*z*") extend along the exposed side or sides (96") of the corrugated Sheet for about a top half (110") of the height (h") of the sheet from the top (90"**) to about half the height (h") of the corrugated sheet.

10. An assembly (118, 118') for supporting biomass for treating wastewater or sludge, the assembly comprising a plurality of corrugated sheets (84, 84') of material, with optional substantially planar sheets (132, 132') of material arranged between adjacent corrugated sheets, the assembly having a front (120, 120') defined by a front surface (86, 86') of a front corrugated sheet (**84*a*, 84*a*'), a rear (122, 122') defined by a rear surface (88, 88') of a rear corrugated sheet (84*z*, 84*z*'), a top (124, 124"), a bottom (126, 126'), a first side (128, 128'), a second side (130, 130'), a height (H, H') extending from the bottom to the top, and a width (W, W') extending from the first side to the second side, the substantially planar sheets extending at least about half (136, 136) of the height (H, H') of the assembly extending from the bottom to the top, the corrugations (98, 98') of the corrugated sheets of the assembly being present in front and rear surfaces of the corrugated sheets with peaks (102, 102') at the front surface and valleys (104, 104') at the rear surface, the corrugations (98, 98') being angled corrugations that are at an angle of about 10° to about 80° with respect to the top and the bottom of the corrugated sheet, the corrugations being generally linear from the top to the bottom of the corrugated sheet; wherein the corrugations of adjacent corrugated sheets with the substantially planar sheet between them are angled in opposite directions, either or both of the first side (94, 94') and second side (96, 96') of the corrugated sheet being an exposed side of the corrugated sheet, and either or both of the first side (128, 128') and the second side (130, 130') of the assembly being an exposed side of the assembly, the exposed side or sides of the sheets and the exposed side or sides of the assembly are to be exposed to wastewater or sludge that is denser outside of the width of the assembly than wastewater or sludge within the width of the assembly, each corrugated sheet having a thickness (t, t') extending from a plane corresponding to the peaks of the corrugations on the front surface of the corrugated sheet to a plane corresponding to the valleys of the corrugations on the rear surface of the corrugated sheet, the angled corrugations extending for the thickness (t, t') of the corrugated sheet, each of a sufficient number of corrugated sheets further comprising a unitarily formed baffle (100, 100') along an exposed side or sides of the corrugated sheet on an exposed side or sides of the assembly, the baffle (100, 100') being a generally vertical corrugation (116, 116'), extending generally vertically along the exposed side or sides of the corrugated sheet for at least about a top half (134, 134') of the height (H', H") of the assembly from the top (90, 90') downwardly to a point at least about half the height (H', H") of the assembly, the baffle extending for the thickness (t, t') of the corrugated sheet, the baffle (100, 100') having a free edge and an edge where the baffle joins the corrugated sheet (84, 84'), the generally vertical corrugation (116, 116') that is the baffle having a flange (114, 114') formed along the free edge and a flange (115, 115') formed along the edge of the corrugated sheet (84, 84') where the baffle joins the corrugated sheet, the flange (114, 114') of a baffle on the exposed side or sides of one corrugated sheet being bonded to a like flange (114, 114') of a baffle on a like exposed side or sides of a corrugated sheet or being bonded to the substantially planar sheets (132, 132'**) positioned adjacent the front or rear surfaces of the corrugated sheets, the bonded baffles or bonded baffles and the substantially planar sheets being sufficient to substantially block air from exiting the exposed side or sides of the assembly or to block denser wastewater or sludge being treated from entering the exposed side or sides of the assembly.

11. The assembly (118) of claim 10, wherein the baffles (100) extend along the exposed side or sides (96) of the corrugated sheets (84) for the height (H) of the assembly.

12. The assembly (118) of claim 11, wherein the optional substantially planar sheets (132) extend for the height (H) of the assembly.

13. The assembly (118') of claim 10, wherein the substantially planar sheets (132') extend for about a bottom half (136') of the height (H') of the assembly.

14. The assembly (118') of claim 13, wherein the baffles (100') extend along the exposed side or sides (130') of the assembly (84') for about a top half (134') of the height (H') of the assembly.

15. An assembly (118") for supporting biomass for treating wastewater or sludge, the assembly comprising a plurality of corrugated sheets (84") of material, with substantially planar sheets (132") of material arranged between adjacent corrugated sheets, the assembly having a front (120") defined by a front surface (86") of a front corrugated sheet (**84*a*"), a rear (122") defined by a rear surface (88") of a rear corrugated sheet (84*z*"), a top (124"), a bottom (126"), a first side (128"), a second side (130"), a height (H") extending from the bottom to the top, and a width (W") extending from the first side to the second side, the substantially planar sheets extending at least about half (136") of the height (H") of the assembly extending from the bottom to the top, the corrugations (98") of the corrugated sheets of the assembly being present in front and rear surfaces of the corrugated sheets with peaks (102") at the front surface and valleys (104") at the rear surface, the corrugations (98") being angled corrugations that are at an angle of about 10° to about 80° with respect to the top and the bottom of the corrugated sheet, the corrugations being generally linear from the top to the bottom of the corrugated sheet; wherein the corrugations of adjacent corrugated sheets with the substantially planar sheet between them are angled in opposite directions, either or both of the first side (94") and second side (96") of the corrugated sheet being an exposed side or sides of the corrugated sheet, and either or both of the first side (128") and the second side (130"**) of the assembly being an exposed side or sides of the assembly, the exposed side or sides of the corrugated sheets and the exposed side or sides of the assembly are to be exposed to wastewater or sludge that is denser outside of the width of the assembly than wastewater or sludge within the width of the assembly, each corrugated sheet having a thickness (t") extending from a plane corresponding to the peaks of the corrugations on the front surface of the corrugated sheet to a plane corresponding to the valleys of the corrugations on the rear surface of the corrugated sheet, the angled corrugations extending for the thickness (t") of the corrugated sheet, wherein either:

(a) all of the corrugated sheets (84") further comprising a unitarily formed baffle (100") along an exposed side or sides of the corrugated sheet on an exposed side or sides of the assembly, the baffle (100") having a substantially flat generally vertical extension (144) with a free edge (146), the substantially flat generally vertical extension (144) extending in a direction generally perpendicular to the plane corresponding to the peaks (102") of the corrugation (98") or to the valleys (104")

of the corrugations (98") and the free edge (146) extending for a distance (d) at least equal to the thickness (t") of the corrugated sheet, the baffle (100") extending generally vertically along the exposed side or sides (96") of the corrugated sheets for at least about a top half (134") of the height (H") of the assembly from the top (90") downwardly to a point at least about half (134") of the height (H") of the assembly, the free edge (146) of the substantially flat generally vertical extension (144) of the corrugated sheet (84") overlaps and is bonded to the adjacent free edge (146) of the substantially flat generally vertical extension (144) of the adjacent corrugated sheets (84"), or (b) each of the front corrugated sheet (84*a*") and the rear corrugated sheet (84*z*") of the assembly of corrugated sheets further comprising a unitarily formed baffle (100") along an exposed side or sides of the corrugated sheet on an exposed side or sides of the assembly, the baffle (100") having a substantially flat generally vertical extension (144) with a free edge (146), the substantially flat generally vertical extension (144) extending in a direction generally perpendicular to the plane corresponding to the peaks (102") of the corrugation (98") or to the valleys (104") of the corrugations (98") and the free edge (146) extending for a distance (d) at least equal to the thickness (t") of the corrugated sheet, the baffle (100") extending generally vertically along the exposed side or sides (96") of the corrugated sheets for at least about a top half (134") of the height (H") of the assembly from the top (90") downwardly to a point at least about half (134") of the height (H") of the assembly, the free edge (146*a*) of the substantially flat generally vertical extension (144*a*) of the front corrugated sheet (84*a*") and the free edge (146*z*) of the substantially flat generally vertical extension (1.44*z*) of the rear corrugated sheet (84*z*") overlap (150) a distance (x) and are bonded to each other;

the overlapped and bonded substantially flat generally vertical extensions (144) to be sufficient to substantially block air from exiting the exposed side or sides (130") of the assembly or to block the denser wastewater or sludge being treated from entering the exposed side or sides (130") of the assembly.

16. The assembly (118") of claim 15, wherein the baffle (100") extends along the exposed side or sides (96") of the corrugated sheet (84") for the height (H") of the assembly.

17. The assembly (118") of claim 16, wherein the substantially planar sheets (132") extend for the height (H") of the assembly.

18. The assembly (118") of claim 15, wherein the substantially planar sheets (132") extend for about a bottom half (136") of the height (H") of the assembly.

19. The assembly (118") of claim 18, wherein the baffle (100") extends along the exposed side or sides (130") of the assembly (84") for about a top half (134") of the height (H") of the assembly.

20. The assembly (118") of claim 15, wherein (a) all of the corrugated sheets (84") further comprising a unitarily formed baffle (100") along an exposed side or sides of the corrugated sheet on an exposed side or sides of the assembly, the baffle (100") having a substantially flat generally vertical extension (144) with a free edge (146), the substantially flat generally vertical extension (144) extending in a direction generally perpendicular to the plane corresponding to the peaks (102") of the corrugation (98") or to the valleys (104") of the corrugations (98") and the free edge (146) extending for a distance (d) at least equal to the thickness (t") of the corrugated sheet, the baffle (100") extending generally vertically along the exposed side or sides (96") of the corrugated sheets for at least about a top half (134") of the height (H") of the assembly from the top (90") downwardly to a point at least about half (134") of the height (H") of the assembly, the free edge (146) of the substantially flat generally vertical extension (144) of the corrugated sheet (84") overlaps and is bonded to the adjacent free edge (146) of the substantially flat generally vertical extension (144) of the adjacent corrugated sheets (84").

21. The assembly (118") of claim 20, wherein the generally vertical extension (144) extends along the exposed side or sides of the corrugated sheet (96") for the height (H") of the assembly.

22. The assembly (118") of claim 21, wherein the substantially planar sheets (132") extend for the height (H") of the assembly.

23. The assembly (118") of claim 20, wherein the generally vertical extension (144) extends along the exposed side or sides (96") of the corrugated sheet for about a top half (110") of the height (H") of the assembly.

24. The assembly (118") of claim 20, wherein the substantially flat generally vertical extension (144) extends in a direction generally perpendicular to and from the peaks (102") on the front surface (86") of the corrugated sheet (84") to a free edge (146) that is beyond the valleys (104") on the rear surface (88") of the corrugated sheet (84") and the substantially planar sheet (132").

25. The assembly (118") of claim 15, wherein (b) each of the front corrugated sheet (84*a*") and the rear corrugated sheet (84*z*") of the assembly of corrugated sheets further comprising a unitarily formed baffle (100") along an exposed side or side of the corrugated sheet on an exposed side or sides of the assembly, the baffle (100") having a substantially flat generally vertical extension (144) with a free edge (146), the substantially flat generally vertical extension (144) extending in a direction generally perpendicular to the plane corresponding to the peaks (102") of the corrugation (98") or to the valleys (104") of the corrugations (98") and the free edge (146) extending for a distance (d) at least equal to the thickness (t") of the corrugated sheet, the baffle (100") extending generally vertically along the exposed side or sides (96") of the corrugated sheets for at least about a top half (134") of the height (H") of the assembly from the top (90") downwardly to a point at least about half (134") of the height (H") of the assembly, the free edge (146*a*) of the substantially flat generally vertical extension (144*a*) of the front corrugated sheet (84*a*") and the free edge (146*z*) of the substantially flat generally vertical extension (144*z*) of the rear corrugated sheet (84*z*") overlap (150) a distance (x) and are bonded to each other.

26. The assembly (118") of claim 25, wherein the free edge (146) extends a distance (d) of at least more than half of the thickness (T") of the assembly, wherein the rear corrugated sheet (84*z*") is in a form of the front corrugated sheet (84*a*") of the assembly that is rotated 180° front to rear, such that the free edge (146*a*) of the substantially flat generally vertical extension (144*a*) of the rear corrugated sheet (84*z*") overlaps (150) a distance (x) with the free edge (146*z*) of the substantially flat generally vertical extension of the front corrugated sheet (84*a*") to substantially block air from exiting the exposed side or sides (130") of the assembly or the denser wastewater or sludge being treated from entering the exposed side or sides (130") of the assembly.

27. The assembly (118") of claim 26, wherein the substantially flat generally vertical extensions (144*a*, 144*z*) of the front and rear corrugated sheets (84*a*", 84*z*") extend along the exposed side or sides (130") of the assembly for the height (H") of the assembly.

28. The assembly (118") of claim 27, wherein the substantially planar sheets (132") extend for the height (H") of the assembly.

29. The assembly (118") of claim 26, wherein the substantially flat generally vertical extensions (144 *a*, 144*z*) of the front and rear corrugated sheets (84*a*", 84*z*") extend along the exposed side or sides (130") of the corrugated sheet for about a top half (134") of the height (H") of the assembly.

30. The assembly (118") of claim 29, wherein the substantially planar sheets (132") extend for about a bottom half (136") of the height (11") of the assembly.

* * * * *